United States Patent [19]

Humphries et al.

[11] Patent Number: 5,621,662
[45] Date of Patent: Apr. 15, 1997

[54] HOME AUTOMATION SYSTEM

[75] Inventors: L. Scott Humphries; Glenn Rasmussen; Douglas L. Voita; James D. Pritchett, all of Naples, Fla.

[73] Assignee: IntelliNet, Inc., Naples, Fla.

[21] Appl. No.: 196,503

[22] Filed: Feb. 15, 1994

[51] Int. Cl.$^6$ ................................................. G06F 19/00
[52] U.S. Cl. ...................... 364/550; 364/138; 364/146; 364/185; 364/505; 340/825.08
[58] Field of Search .................................. 364/138, 146, 364/185, 505, 514 R, 514 C, 550, 492, 480; 340/310.01, 310.02, 825.08, 825.06

[56]   References Cited

U.S. PATENT DOCUMENTS

| | | | |
|---|---|---|---|
| 4,121,284 | 10/1978 | Hyatt | 341/24 |
| 4,353,502 | 10/1982 | Myers | 236/47 |
| 4,442,972 | 4/1984 | Sahay et al. | 236/1 EA |
| 4,567,557 | 1/1986 | Burns | 364/138 |
| 4,621,200 | 11/1986 | Lovrenich | 307/149 |

(List continued on next page.)

FOREIGN PATENT DOCUMENTS

| | | |
|---|---|---|
| 00488178 | 6/1992 | European Pat. Off. . |
| 0262997 | 10/1988 | Japan . |
| 0013853 | 1/1989 | Japan . |

OTHER PUBLICATIONS

"Samantha's Features Will Excite You" Popular Science, Dec. 1991, p. 49 Home Automation on the Verge? The Insitute, Aug. 1987, by J. Voelcker.

"The Integrated Automated Educated House", Popular Science, Jun. 1990, by V. Elaine Gilmore.

"Remote Control of Heating Systems in Weekend Cottages", Tele 2, 1971 by Hans Lardner Homefone advertisement, Mar. 25, 1983.

"Entry–level Smart Home," Popular Science, Jun. 1992.

Lin, Tzung–Pao, "A Multi–Function ISDN Home Communication System," *IEEE Transactions on Consumer Electronics*, vol. 36, No. 4, Nov. 1990, pp. 892–896.

Yang, JaeSoo et al., "Investigation of the Performance of a Controlled Router for the CEBus," *IEEE Transactions on Consumer Electronics*, vol. 38, No. 4, Nov. 1992, pp. 831–841.

Tanaka et al., "The Transceiver Controller IC for Home BUs System," *Consumer Electronics, 1988 International Conference*, 1988, pp. 100–101.

Perry, T.S., "Portia's Perfect Pad: Superhigh–Tech (house)," *IEEE Spectrum*, vol. 22, No. 5, May 1985, pp. 56–63.

Gutzwiller, F.W., "Control networks for the home," *Machine Design*, vol. 55, No. 24, Oct. 1983, pp. 109–112.

"Centralizing security, communication and control brings home control closer to reality," *JEI—Journal of the Electronics Industry*, vol. 31, No. 3, Mar. 1984, pp. 18–24.

Douligeris et al., "Communications and control for a home automation system," *Southeastcon, 1991, IEEE Conference Proceedings*, 1991, pp. 171–175.

*Primary Examiner*—Edward R. Cosimano
*Assistant Examiner*—Kyle J. Choi
*Attorney, Agent, or Firm*—Kilpatrick & Cody, L.L.P.; George T. Marcou

[57]   ABSTRACT

A home automation system comprises a number of sub-systems for controlling various aspects of a house, such as a security sub-system, an HVAC sub-system, a lighting control sub-system, and an entertainment sub-system. The network comprises a host computer connected through a host interface to a plurality of nodes. The network is in a free form topology and employ asynchronous communication. The host computer polls each node on the network to determine system configuration and to perform a diagnostic check on the system. The messages that are transmitted between the nodes are comprised of a source address, a destination address that uniquely identifies the location of each piece of hardware on the system, a message type field, and a data length segment. Each hardware device has a mirror image software object in the host computer to which messages are directed. The user interfaces for the various sub-systems share a common interfacing method whereby use of the system is greatly simplified.

54 Claims, 19 Drawing Sheets

U.S. PATENT DOCUMENTS

| | | | |
|---|---|---|---|
| 4,644,104 | 2/1987 | Middlemiss | 379/103 |
| 4,665,544 | 5/1987 | Honda et al. | 379/104 |
| 4,689,785 | 8/1987 | Toyonaga et al. | 370/85.3 |
| 4,742,475 | 5/1988 | Kaiser et al. | 364/138 |
| 4,845,773 | 7/1989 | Attallah | 379/102 |
| 4,887,064 | 12/1989 | Drori et al. | 340/426 |
| 4,899,217 | 2/1990 | MacFadyen et al. | 348/8 |
| 4,918,445 | 4/1990 | Bower | 341/26 |
| 4,959,713 | 9/1990 | Morotomi et al. | 348/156 |
| 5,003,457 | 3/1991 | Ikei et al. | 364/133 |
| 5,051,720 | 9/1991 | Kittirutsunetorn | 340/310.02 |
| 5,059,974 | 10/1991 | Wu | 341/25 |
| 5,070,330 | 12/1991 | Wu | 341/26 |
| 5,086,385 | 2/1992 | Launey et al. | 364/188 |
| 5,109,222 | 4/1992 | Welty | 340/825.72 |
| 5,113,294 | 5/1992 | Kim | 360/33.1 |
| 5,119,412 | 6/1992 | Attallah | 379/102 |
| 5,218,552 | 6/1993 | Stirk et al. | 364/492 |
| 5,233,342 | 8/1993 | Yashito et al. | 340/825.06 |
| 5,268,666 | 12/1993 | Michel et al. | 340/310.06 |
| 5,289,365 | 2/1994 | Caldwell et al. | 364/138 |
| 5,296,840 | 3/1994 | Gieffers | 340/474 |
| 5,382,951 | 1/1995 | White et al. | 340/825.52 |
| 5,400,246 | 3/1995 | Wilson et al. | 364/146 |
| 5,410,292 | 4/1995 | Le Van Suu | 340/310.06 |

5,621,662

HOME AUTOMATION SYSTEM

CROSS REFERENCE TO RELATED APPLICATIONS

Reference is made to commonly-owned application Ser. No. 08/196,472 (Atty. Docket No. INT-002), therfor; the disclosure of which is hereby incorporated, entitled "AC Power Module for Automation System," filed on Feb. 15 1994.

BACKGROUND OF THE INVENTION

1. Field of the Invention

This invention generally relates to a home automation system and, more particularly, to an interface between a host computer and a network, to a watchdog timer, to a method of polling nodes, to a software message scheme, to a common method of controlling sub-systems in the home automation system, and to a button keypad assembly.

Additionally, this invention relates to a temperature sensor for accurately measuring ambient temperature. More specifically, it relates to an apparatus for providing a temperature-indicating signal to a home automation system which maintains a desired temperature in a closed environment.

2. Description of the Prior Art

FIG. 1 illustrates a network configuration of a prior art home automation system. The network comprises a host computer 10 set up in a daisy-chain configuration with a plurality of nodes 12, 14, and 16. The network has synchronous communication between the host computer 10 and the nodes whereby each message transmitted from the host computer 10 passes through each node. With this system, each message passes through each node until the message reaches the node addressed by the transmitted message. This node receives and processes the message and then transmits the message to the next node. Each node has a transceiver for receiving the message from a previous node and for transmitting the message to the next node. The host computer 10 receives the circulated message from the last node in the loop and checks the message for errors.

The message is comprised of a command byte, a node byte, and one data byte. The command byte indicates whether the message is just a command or if it also has a data byte along with the command. The node byte identifies the node to which the message is directed and the data byte contains the actual data. Therefore, for instance, to update the display of an LCD display at some node on the network, each character in the display had to be sent to the node with a different message. As another example, in order to dim the lights, messages were continuously transmitted to the node until the accepted level was reached.

Each byte is individually transmitted onto the daisy-chain network where it is circulated around the network to each node. The host computer 10 waits until a byte has been completely circulated around the loop and then checks the byte for errors. The node byte can address up to 80 different nodes and contains a node ID data segment and a connection data segment.

As should be apparent from the above description, the prior art home automation system uses a short data link resulting in relatively slow communication between the host computer 10 and the nodes. Also, a failure of a node in the loop disables the entire network by producing a discontinuity.

Additionally, in the prior art home automation system, with reference to FIG. 2, the host computer 10 received operating power from a central PC power supply 19, which also supplied power to the various nodes 12, 14, 16, and 17 in the network. With this system, when the supply of power to the host computer 10 is interrupted, the various nodes in the network would also be disconnected from power. Thus, a single power failure could disable the entire system, including the security system. In addition to the problems in reliability, the prior art power system could only accommodate a limited number of components. Thus, the prior art home automation system was limited in its ability to expand to accommodate more nodes.

Furthermore, previous prior art home automation systems are typically a collection of sub-systems produced by different manufacturers which are designed to work as stand alone systems in the home. These prior art home automation systems combine the third party sub-systems, such as lighting control sub-systems, audio/video control sub-systems, and security sub-systems, and provide limited communication to a central computer with automation software.

With such a prior art home automation system, a user needs to learn how to operate each one of the sub-systems. Additionally, if communication is necessary between the user and the sub-system, the user must learn how to use the interface to the central computer or must call a service representative to make any desired changes to the system. Thus, the user must learn a separate manner of operating and communicating with each sub-system in the home automation system, which is typically between four and six sub-systems.

For instance, a prior art home automation system may use an existing home security system with its own unique keypad and set of keystrokes and link it to a central controller. A prior art home automation system may also connect the central controller to an existing lighting system, with its own unique keypad and set of keystrokes to control the lighting. Other sub-systems, with their own unique methods and devices for communicating with a user, may also be connected to the central controller. For a user to control the security system, to control the lights, and to control the other sub-systems, the user must learn how to interface with the security sub-system, the lighting control sub-system, as well as the other sub-systems.

A problem exists with this system in that it becomes rather difficult and complicated for a user to properly control each system. Because each sub-system has its own unique device and method of interfacing with the user, it becomes even more difficult and burdensome for a user to operate the prior art home automation system.

As a result, users of home automation systems typically do not operate the home automation system to its full capacity. Instead, a technician will set up the home with several global scenarios over which the home owner will have limited control. If the user desires a change in the system or wishes to take advantage of the system's capability, a technician is typically called to do the interfacing with the system.

The prior art home automation systems may be used to automatically control a variety of activities such as turning lights and appliances on and off. Additionally, such systems may be used to regulate the ambient climate in a closed environment such as a home or office. Climate control may include the maintenance of a desired ambient temperature or humidity level.

The most common method of maintaining a desired ambient temperature in a closed environment is to provide a temperature sensor together with a thermostat. However, many conventional home automation systems utilize solid state components in such arrangements which are continuously active. This results in the generation of heat which introduces error into the temperature sensing circuit. While it may be attempted to shield the sensing component from the remainder of the circuit, the heat generated from active components is often not sufficiently eliminated.

Alternatively, the sensing component may be separated from the remainder of the sensing circuit in order to reduce the error introduced by the other components. It may also be separated in order to place it in an optimum location in a particular environment, for example away from direct sunlight or from heating or cooling ducts. However, if the sensing component is separated from the remainder of the circuit by a relatively large distance, error is introduced in the reading from transmission noise and the like. This problem is particularly pronounced where a voltage signal is used to indicate the ambient temperature.

Accordingly, there is a need to provide a temperature sensing circuit capable of obtaining stable, accurate measurement of the ambient temperature in various closed environments. There is a particular need to provide a sensing circuit which is capable of providing accurate temperature measurements to a temperature control device separated by a relatively long distance and which does generates a relatively small amount of heat.

The prior art home automation system has several diagnostic features incorporated in both the hardware and software in order to overcome problems associated with failure of certain parts of the system. The basic approach of these features is to detect and indicate a failure in an aspect of the system. However, there remains a risk that the host computer 10 itself will fail, thereby eliminating the means by which the operator is alerted to a problem with the system. Hence there is a need to monitor the system and provide an indication that the host computer 10 no longer is operating.

The prior art home automation systems also used button interfaces that were prone to several problems. One problem was that the interfaces were relatively complex requiring strict tolerances between parts. It was therefore prone to improperly fitting parts. Another problem was that covers for the interfaces were not securely fastened to a backplate so that the cover would fall off rather easily. Thus, it was a problem in the prior art to provide an economical and securely fastened interface.

SUMMARY OF THE INVENTION

It is an object of the present invention to provide an apparatus for interfacing a host computer to a link power network.

It is also an object of the present invention to provide a host interface that buffers and optically isolates signals supplied to a host computer from signals on a link power network.

It is another object of the present invention to provide a home automation system that can perform diagnostic measures to detect when a node has been disconnected from the network.

It is a further object of the present invention to provide a home automation system that can automatically add new nodes to the network.

It is yet another object of the present invention to provide a home automation system that has an addressing scheme which uniquely identifies each hardware device and each software object in the network.

It is yet a further object of the present invention to provide a home automation system where each hardware device has a mirror image software object.

It is still another object of the present invention to provide a single means of interfacing that is shared with more than one sub-system in the home automation system.

It is still a further object of the present invention to provide a temperature sensor that is accurate and stable and which generates a relatively small amount of heat.

It is also an object of the present invention to provide a watch dog timer that accurately detected failures in the home automation system.

It is another object of the present invention to provide a interface that is economical yet has a cover that securely fastens to a backplate.

Additional objects, advantages and novel features of the invention will be set forth in the description which follows, and will become apparent to those skilled in the art upon reading this description or practicing the invention. The objects and advantages of the invention may be realized and attained by the appended claims.

To achieve the foregoing and other objects, in accordance with the present invention, as embodied and broadly described herein, a first aspect of the invention comprises an apparatus for interfacing a host computer to a link power network. The apparatus comprises a network interface circuit connected to the link power network for filtering out informational signals from a DC component. The network interface circuit supplies the informational signals to a neuron processor circuit, which then processes the signals and outputs a converted form of the informational signals. The converted informational signals are passed through a bus interface circuit before being supplied to the host computer. The bus interface circuit provides buffering and handshaking signals for the communication between the neuron processor circuit and the host computer.

A second aspect of the invention comprises a home automation system having a number of sub-systems, such as a security sub-system, a lighting control sub-system, and an environmental control sub-system. The home automation system comprises a controller for providing centralized control of the sub-systems and an interface for connecting the controller to a network. A plurality of nodes located in the various sub-systems are connected in a free form topology on the network and are in asynchronous communication with the controller. The controller transmits at periodic intervals a message to each node on the network. Each node then responds to this message by transmitting an acknowledgement message to the controller. The controller detects whether a node has been disconnected from the network based upon a comparison of the received acknowledgement messages to a directory containing a list of all nodes that should be on the network.

A third aspect of the invention comprises a home automation system having a number of sub-systems, such as a security sub-system, a lighting control sub-system, and an environmental control sub-system. The home automation system comprises a controller for providing centralized control of the sub-systems and an interface for connecting the controller to a network. The controller and the nodes use an addressing scheme that has an address for indicating the source of the message, an address for indicating the destination of the message, a segment indicating the type of message, a segment indicating the length of the message, as well as the data in the message. The destination address uniquely identifies each object that forms part of the network, whether that object is a hardware device physically on the network or a software object representing a hardware device. Preferably, all communication to and from each hardware device is through its mirror image software object.

A fourth aspect of the invention comprises a home automation system having a number of sub-systems, such as a security sub-system, a lighting control sub-system, and an environmental control sub-system. The home automation system comprises a controller for providing centralized control of the sub-systems and an interface for connecting the controller to a network. The home automation system also has a first user interface for a first sub-system and a second user interface for a second sub-system. A first user input at the first user interface controls a first hardware device in the same manner as a second hardware device is controlled when the first user input is detected at the second user interface. Also, a second user input at the first user interface controls the first hardware device in the same manner as the second hardware device is controlled when the second user input is detected at the second user interface. Thus, the user interfaces for the first and second user interfaces employ a common means of controlling associated devices.

A fifth aspect of the invention comprises a watch dog timer for use in a home automation system. According to this embodiment of the invention, a watch dog timer circuit initiates a phone call to an off-site location when an operation signal is not received in a predetermined time interval from the host processor. In this way, an indication is provided to the off-site location that the host processor is not operational.

A sixth aspect of the invention comprises a temperature sensor for use in a home automation system. According to this embodiment of the invention, the environmental control sub-system includes a controller which periodically pulses a temperature sensor circuit to an operational mode whereby the temperature sensor circuit provides a signal indicating an ambient temperature of an environment in which the sensor is located.

BRIEF DESCRIPTION OF THE DRAWINGS

The accompanying drawings, which are incorporated in, and form a part of, the specification, illustrate embodiments of the present invention and, together with the description, serve to explain the principles of the invention. In the drawings.

DETAILED DESCRIPTION OF THE PREFERRED EMBODIMENT

Reference will now be made in detail to the preferred embodiments of the invention, examples of which are illustrated in the accompanying drawings.

Figure 1:
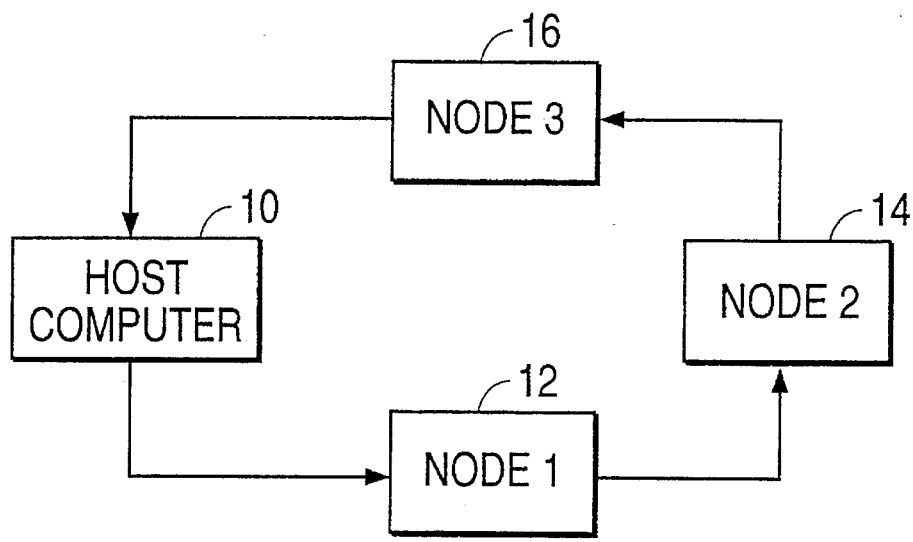
FIG. 1 is a block diagram of a network configuration in a prior art home automation system.
Figure 2:
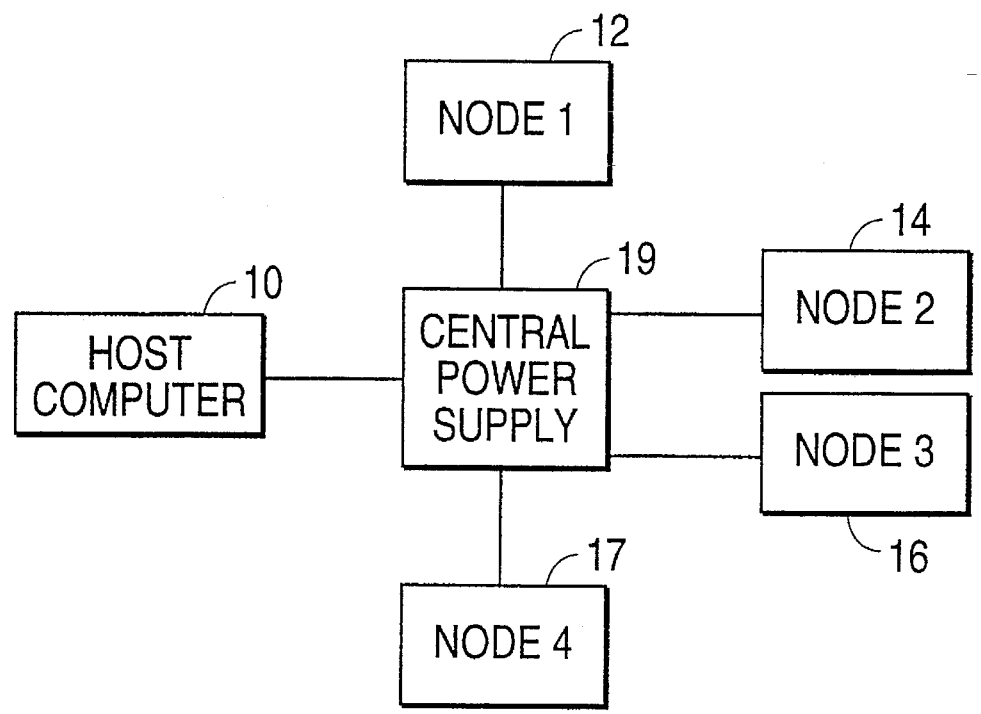
FIG. 2 is a block diagram of a power supply system in a prior art home automation system.
Figure 3:
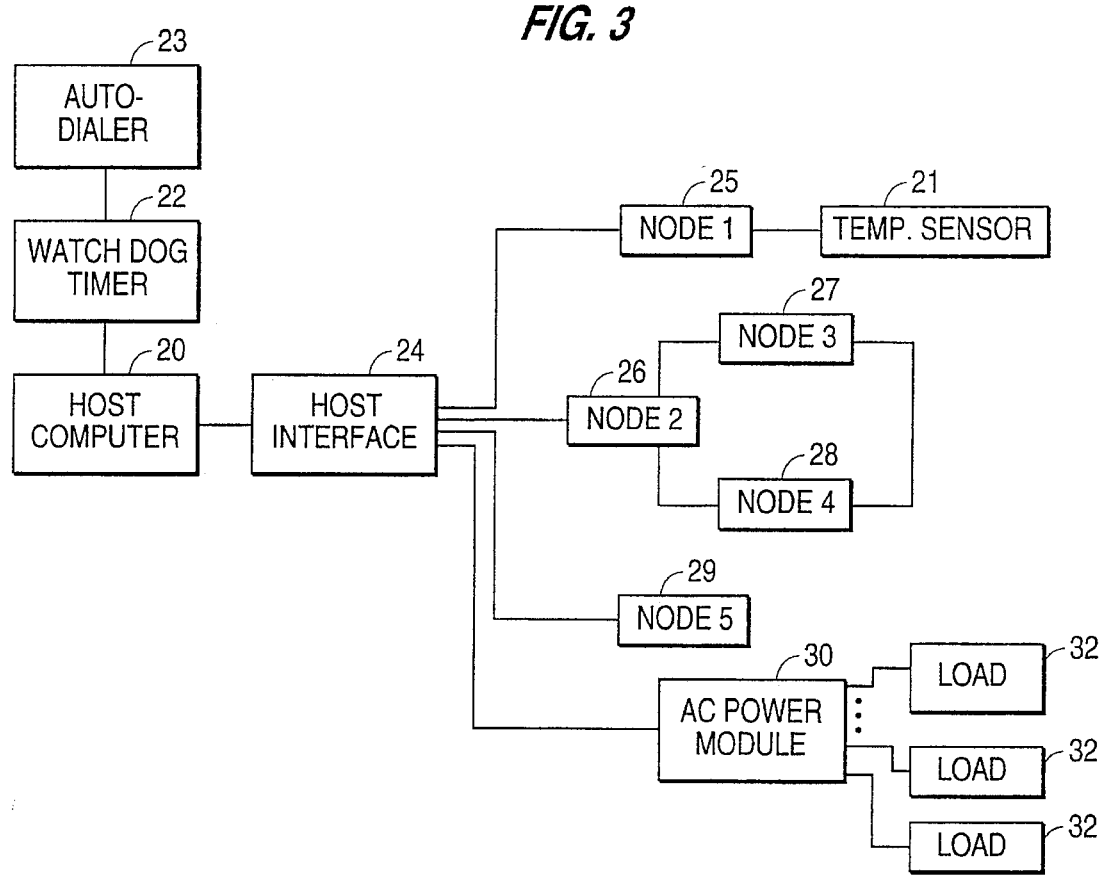
FIG. 3 is a network configuration of a home automation system according to an embodiment of the invention.

As shown in FIG. 3, an embodiment of the invention uses a free form topology. The network comprises a host computer 20 connected through a host interface 24 to a plurality of nodes, such as an AC Power Module node. The host computer 20 is also connected to a watch dog timer 22 which is then connected to an auto-dialer 23. Each node may then be connected to other nodes, such as node 2 which is connected in a star topology with nodes 3 and 4. As shown with node 1, the nodes may have other hardware devices connected to them, such as a temperature sensor.

The nodes are preferably interconnected with a twisted pair conductors onto an Echelon network and have communication signals modulated onto a supply of DC power, preferably a 42 VDC power supply. Unlike the prior art home automation system, however, the nodes in the invention may receive operating power from an independent source of power and need not necessarily receive operating power over the twisted pair conductors. Therefore, a single power failure would not disable the entire system since more crucial components would receive power from independent sources.

Figure 4:
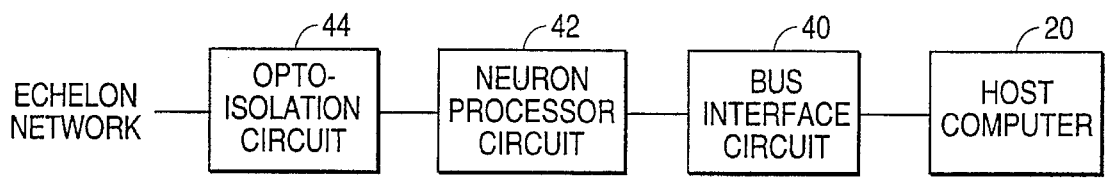
FIG. 4 is a block diagram of a host interface.

With reference to FIG. 4, the host interface 24 comprises a bus interface circuit 40, a neuron processor circuit 42, and an opto-isolation circuit 44. The neuron processor circuit 42 receives information from the host computer 20 through the bus interface circuit 40, processes the received information, and outputs the information to the opto-isolation circuit 44. The opto-isolation circuit 44 optically isolates the signals from the neuron processor circuit 42 from the signals on the link power network and transmits the signals from the neuron processor circuit 42 out over the link power network to the nodes forming the system.

When data is received from a node over the link power network, the opto-isolation circuit 44 intercepts the data off of the network, buffers the data, optically isolates the data, and transmits the data to the neuron processor circuit 42. The neuron processor circuit 42 then processes the data before supplying the signals to the host computer 20 through the bus interface circuit 40.

Figure 5A:
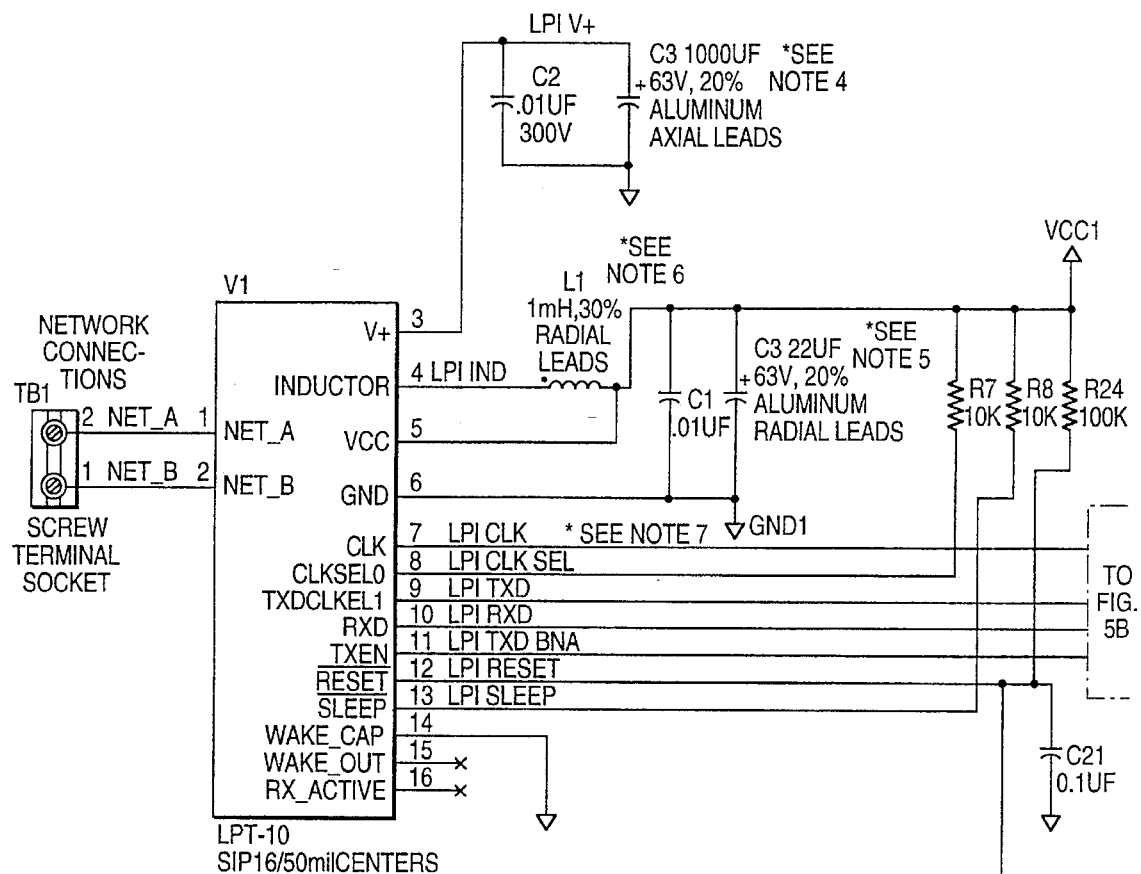
FIGS. 5A and 5B together comprise a schematic diagram of an opto-isolation circuit in the host interface.
Figure 5A:
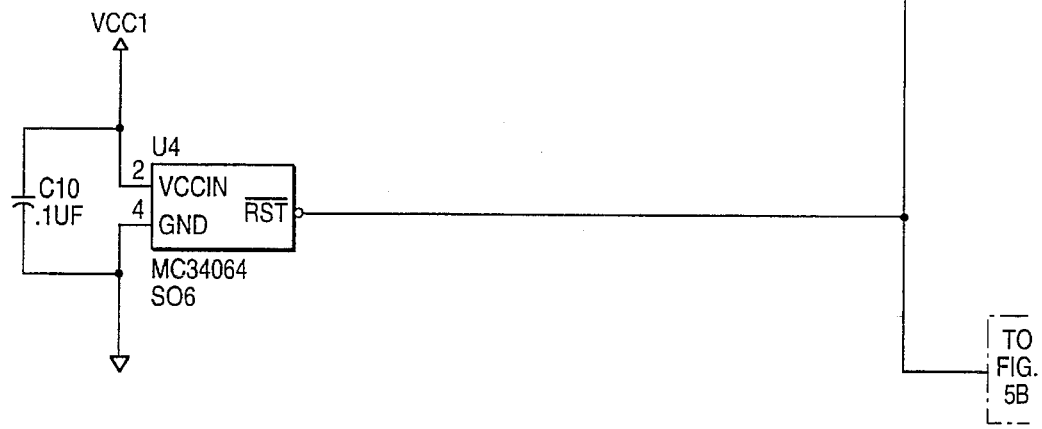
Figure 5B:
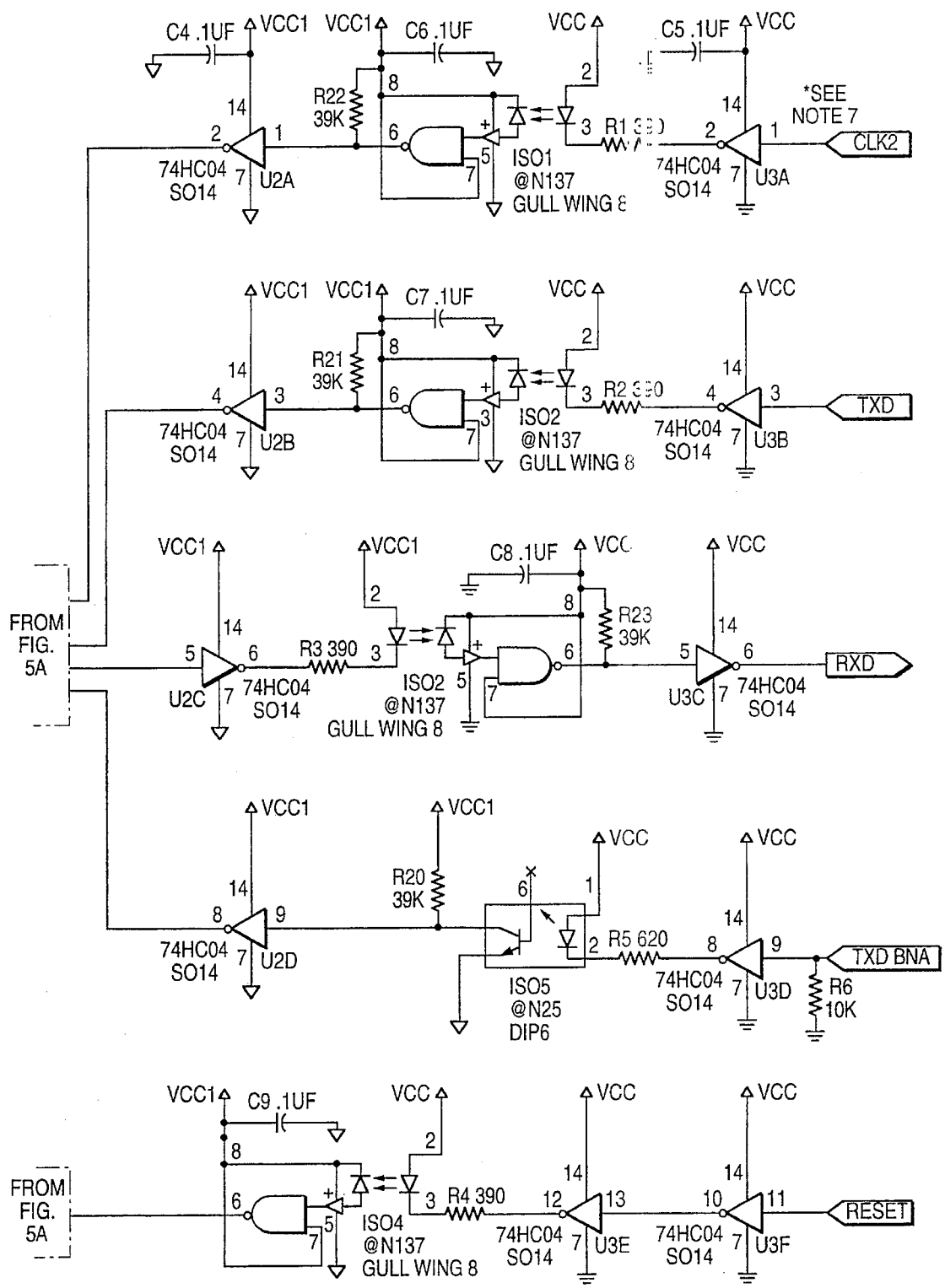

FIGS. 5A and 5B show an embodiment of the opto-isolation circuit 44. The link power network is connected to the host interface 24 circuit at a pair of network connections TB1. A link power transceiver U1, which is preferably the Echelon LPT-10 Link Power Interface Circuit, receives the signals on the link power network and filters the communications signals from the supply of DC power. The link power transceiver U1 takes the 42 VDC supply of power and produces a 5 volts DC supply of power VCC1 at its pin 5.

The received communication signals are passed through a buffer amplifier U2C, a high speed opto-isolator ISO3, and then through a second buffer amplifier U3C before being supplied to the neuron processor circuit 42. The communication signals are also inverted by the buffer amplifiers U2 or U3 before being supplied to the opto-isolators ISO and are then again inverted by buffer amplifiers U3 or U2 after passing through the opto-isolators. Thus, the opto-isolation circuit 44 provides both buffering and opto-isolation for the communication signals.

A CLK2 signal input into buffer amplifier U3A is used as an oscillator for the neuron processor U6. A TXD signal comprises data transmitted from the neuron processor U6, a RXD signal is data to be supplied to the neuron processor U6, and a TXD ENA signal is a transmit enable signal. Finally, a RESET signal is used to reset the home automation system.

Figure 6:
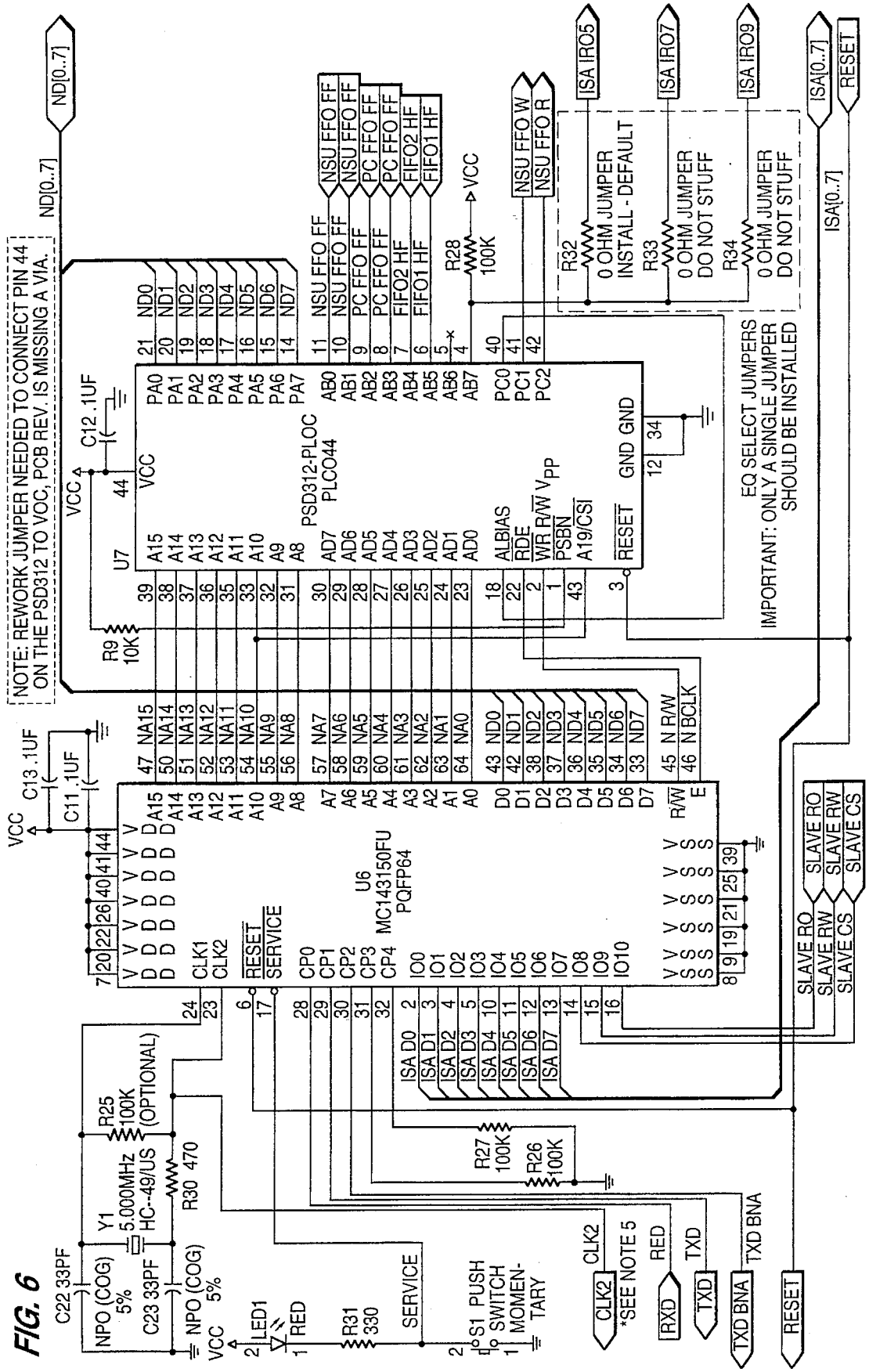
FIG. 6 is a schematic diagram of a neuron processor circuit in the host interface.

An embodiment of the neuron processor circuit 42 is shown in FIG. 6. The neuron processor circuit 42 comprises an Echelon neuron processor U6, which is preferably a Motorola MC143150FU processor. The Echelon neuron processor U6 cooperates with the Echelon link power transceiver U1 to convert data on the link power network into a form compatible with the host computer 20. The neuron processor circuit 42 also comprises a peripheral system device U7 for supporting the neuron processor U6. The peripheral system device U7 contains, for instance, EPROM, RAM, and ROM and holds the programming for the neuron processor U6.

A first path of communication between the neuron processor U6 and the host computer 20 is through pins IO0 to IO10 on the neuron processor U6. Pins IO0 to IO7 are directly connected to the ISA bus on the host computer 20 and pins IO8 to IO10 are the handshake signals for the ISA bus. These pins IO0 to IO10 allow an interface to the host computer 20 in a slave B mode of operation. This interface allows the host computer 20 to supply control signals to the neuron processor U6 in a direct path of communication with a minimal delay time.

A second path of communication between the neuron processor U6 and the host computer 20 is through a group of FIFO memories U8 and U9, shown in FIG. 7. On the programmable system device U7, the PB0 to PB7 pins are status flags from the FIFOs so that the status may be read back at the neuron processor U6. This path of communication also has the ability to use the ISA bus interrupt structure to select one of interrupts ISA IRQ5, ISA IRQ7, or ISA IRQ9. By selecting one of these three interrupts, the neuron processor U6 has the ability to interrupt the host computer 20 at appropriate times, such as when the neuron processor U6 needs to be serviced. This second path of communication is preferably used for providing messages to the various nodes on the Echelon link power network.

Figure 7A:
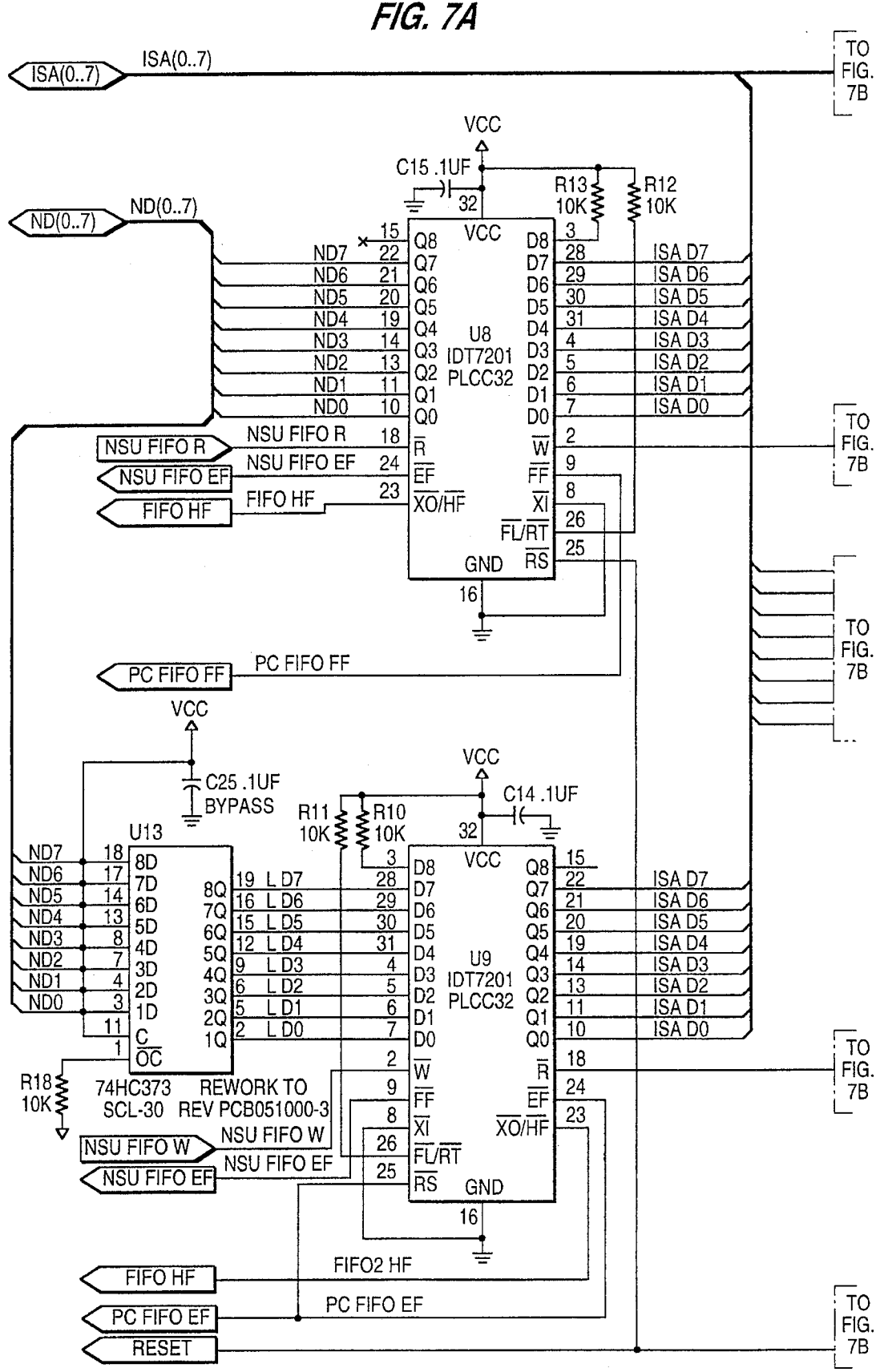
FIGS. 7A to 7C together comprise a schematic diagram of a bus interface circuit in the host interface.
Figure 7B:
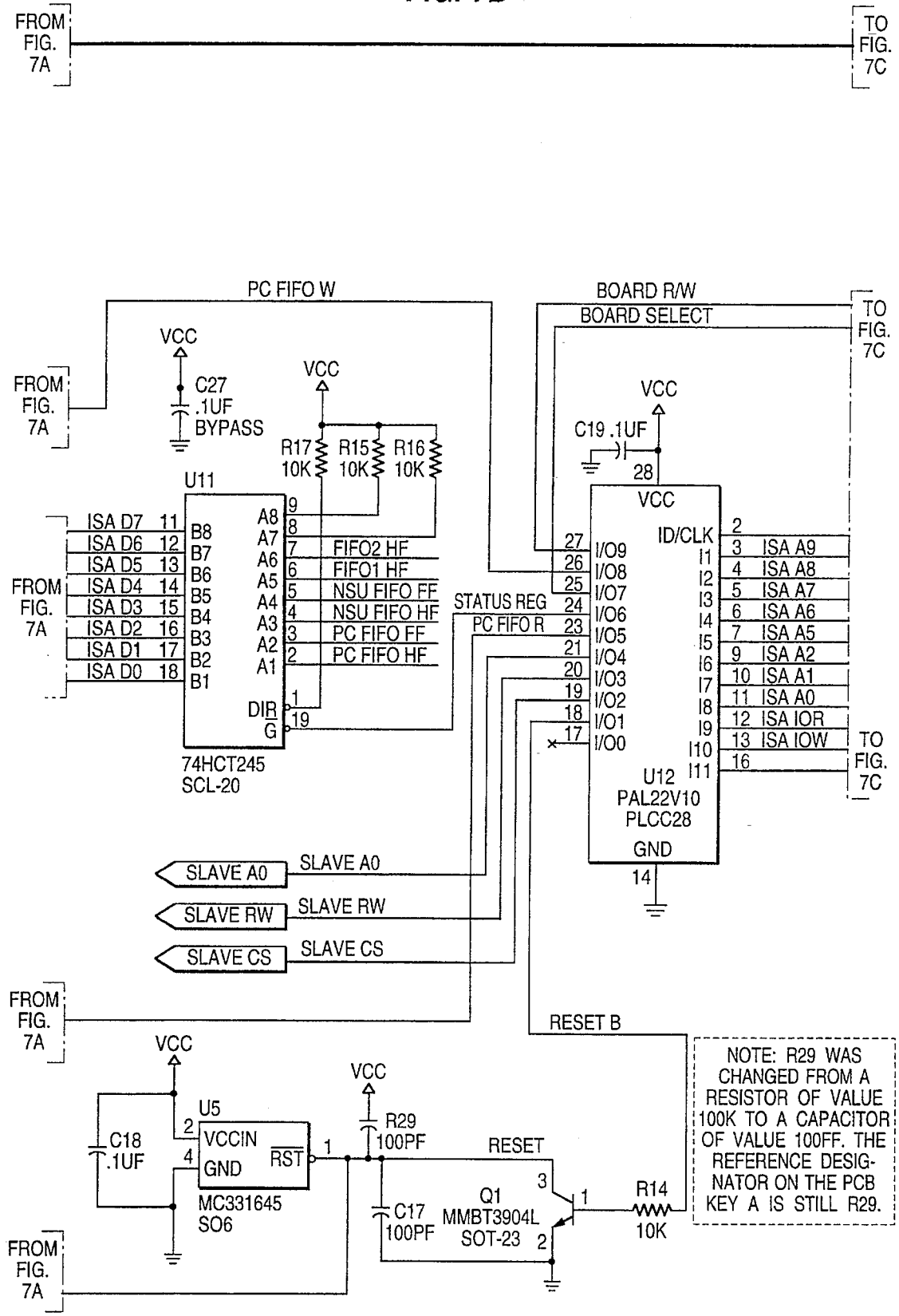
Figure 7C:
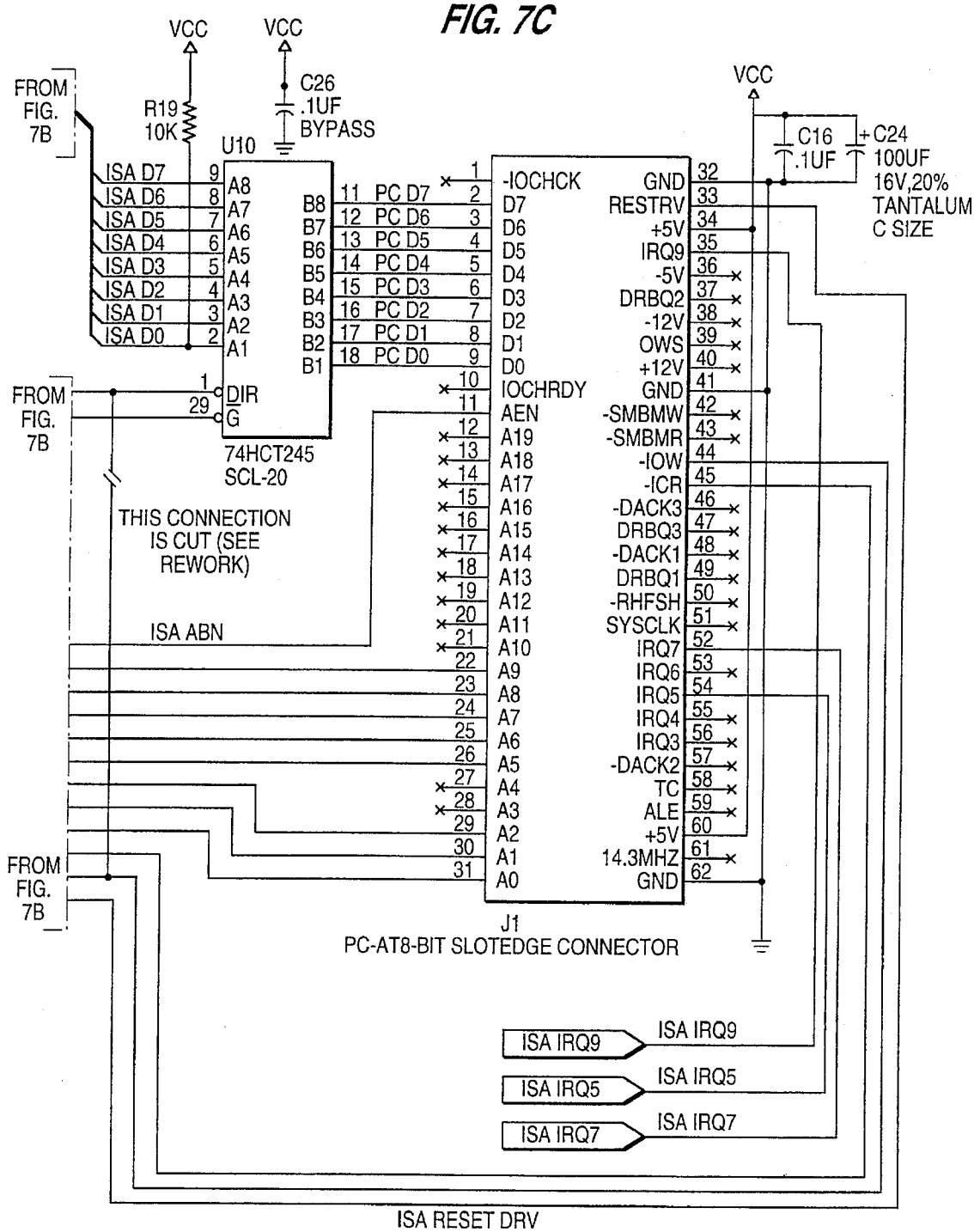

FIGS. 7A to 7C illustrate an embodiment of the bus interface circuit 40. This circuit 40 comprises a FIFO memory U8 for storing data that is transmitted from the host computer 20 to the neuron processor U6 and a FIFO memory U9 for storing data that is transmitted from the neuron processor U6 to the host computer 20. The FIFOs are, for instance, 512 bytes deep and act as a buffer between the host computer 20 and the neuron processor U6. In other words, the host computer 20 can write to the FIFO memory U8 at full speed and the neuron processor U6 read data at its own speed.

The bus interface circuit 40 also comprises a programmable logic device U12, which is preferably a PAL for performing decode logic. The programming of the PAL is within the capability of one of ordinary skill in the art. The programmable logic device U12 handles the handshaking between the host computer 20 and the neuron processor U6 and, for instance, receives the signals coming in from the ISA bus, the address bus signals needed to read and to write, and then also the DMA address enable signals.

The programmable logic device U12 supplies signals to the FIFOs and to the host computer 20 based upon the decode logic programmed in the device U12. For instance, the programmable logic device U12 supplies the Board Select signal, the read and write signals to the FIFOs, and the read and write signals for the slave B mode operation to the host computer 20.

The bus interface circuit 40 also comprises a status register U11. The status register contains the flags for the FIFO data, such as FIFO full, FIFO empty, as well as other status flags. These status flags in the status register U11 are supplied to the host computer 20.

The bus interface circuit 40 additionally comprises a reset circuit having a low voltage detector and reset chip U5. The reset chip U5 detects a low voltage condition and produces a reset signal which is then supplied throughout the host interface 24. In addition to the power-up reset capability, the host interface 24 also has the ability to initiate a software reset through the programmable logic device U12. The programmable logic device U12 has an address reserved for the initiation of a software reset through the ISA bus.

As generally shown in FIG. 3, the system includes a circuit which is referred to as a "watch dog timer" 22. This circuit periodically monitors the host computer 20 to verify that the home automation system remains active. If the system fails to indicate that it still is on line, the watch dog timer 22 can initiate a call over the telephone lines to an off-site location and indicate that the system is not active.

Figure 8:
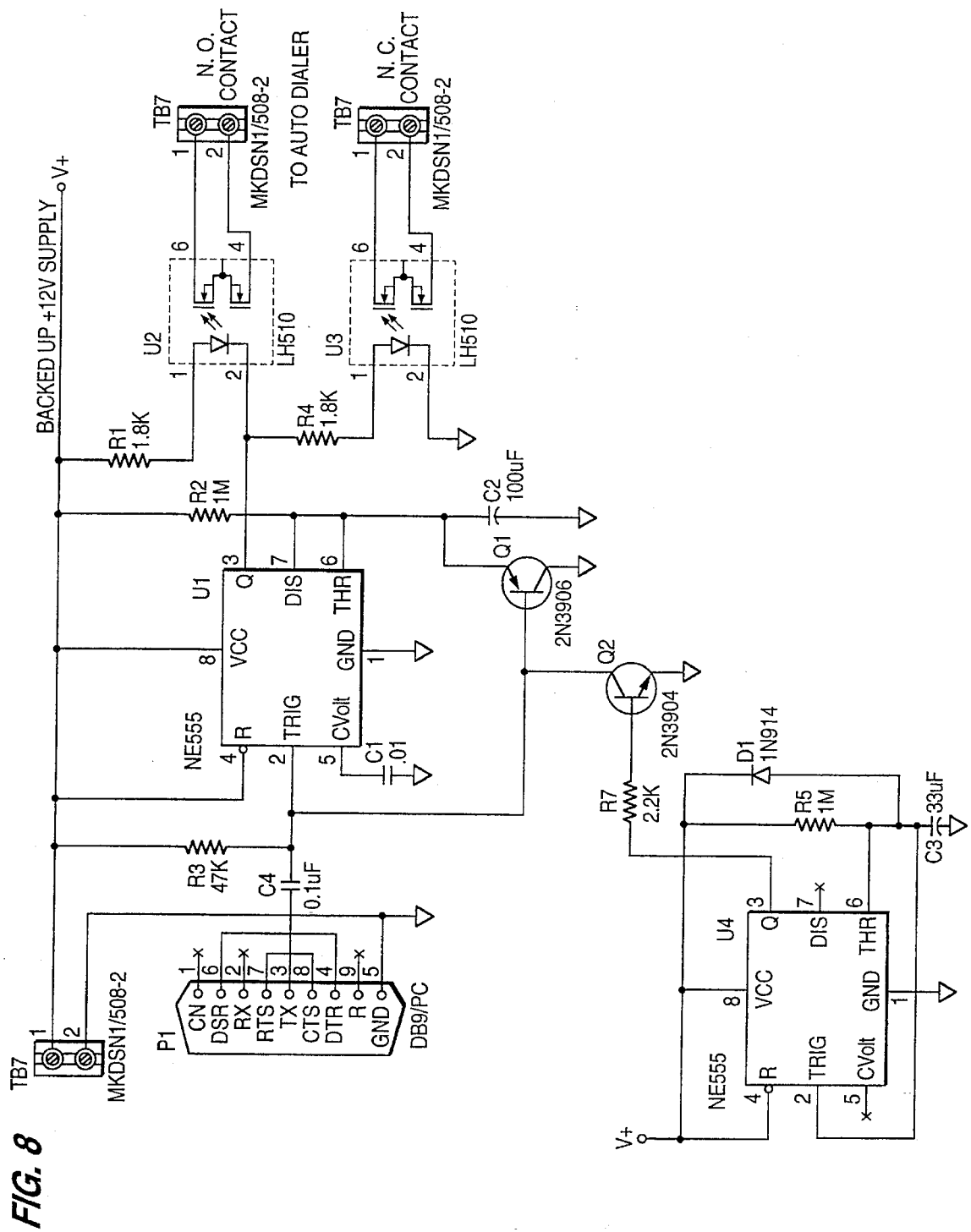
FIG. 8 is a schematic diagram of a watch dog timer.

FIG. 8 is a schematic diagram showing an embodiment of the watch dog timer 22 according to the present invention. As shown, the watch dog circuit is capacitively coupled to the host computer 20 through a serial port. The host computer 20 is programmed to periodically toggle the signal from the serial connector. The change in the logic state input through the capacitor C4 and the transistor Q1 maintains the input to the timer circuit and prevents "timing out" of the circuit. If the input does not change within the time interval set by the R-C time constant provided by the arrangement of resistor R1 and capacitor C2, the timer will send a signal from its Q output to optical switches U2 and U3 which in turn initiates an automatic dialing signal. Once a connection is made with an external site, a preset message is sent which indicates that the main system is no longer indicating that it is active, according to a technique known in the art.

To ensure the reliability of the monitor feature provided by the watch dog timer 22, the watch dog circuit is powered by a backed-up supply which is independent of the power supplied to the rest of the system. Further, as shown, the watch dog circuit includes a power-up reset circuit. The reset circuit includes a timer circuit U4 which is coupled to a second resistor-capacitor configuration comprised of resistor R5 and capacitor C3. A diode D1 is placed in parallel with the resistor R5. These passive elements provide a time constant which holds the input to the base of a transistor for sufficient time to permit the system to power up.

With reference again to FIG. 3, the home automation system is in a free form configuration. Messages are transmitted asynchronously between the host computer 20 and the various nodes on the network. Each message contains a source address that indicates the node sending the message, a destination address that identifies the node which should intercept the message, and data that can be up to 22 bytes long. When a node transmits a message to another node, each node compares the destination address to their own particular address and only when a match occurs does the node intercept the message and process the message.

Because communication is asynchronous, a message may be transmitted at anytime the bus is free. The nodes are always listening to the signals on the network and if the bus has not been captured, a node is then capable of transmitting a message onto the network. When a node has a message to transmit and the bus has been captured by another node, then the node randomly monitors the bus until a free slot to transmit a message has been detected.

As part of an error checking routine, the host computer 20 transmits at periodic intervals a message to every node to determine whether or not that node is connected to the network. The nodes then respond by transmitting an answer back to the host computer 20 that informs the host computer 20 that they are connected to the network and lets the host computer 20 know whether any difficulties have been encountered. From the responses and based upon records the host computer 20 keeps in a directory as to which nodes should be connected to the network, the host computer 20 can detect if any node has been disconnected from the network.

When the host computer 20 does not receive a response from a node that should be connected to the network, the host computer 20 can activate an auto-dialer 23 to make a service call, for example, to a monitoring service. For instance, a service call might be made when a node significant to the operation of the system has been disconnected. Also, a call may be made to the police if the security node has been disconnected. If the host computer 20 decides that the system can operate without that node, the host computer 20 would then continue normal processing.

The home automation system uses an addressing scheme that allows the connection of up to 31,878 nodes. Each destination address is comprised of a domain segment, a node ID segment, a type segment, a subtype segment, a board segment, and a connection segment.

The domain segment indicates whether the node resides in the host computer 20 as a software object or resides on the network as a hardware object. The network is designed so that each physical node on the Echelon network has a mirror image software entity within the host computer 20. The only difference between addressing a physical Echelon node and a software entity is in the domain segment. Specifically, a domain segment of 0 represents a hardware entity and a domain segment of 1 represents a host computer software entity. The host computer software entity includes other software objects in addition to mirror image software entities.

In operation, when the host computer 20 wants to transmit a message to a node on the network, the host computer 20 transmits the message to the mirror image software entity in the host computer 20. The mirror image software entity then commands the host computer 20 to talk to the physical node out on the network. With such an addressing scheme, when a physical node receives a message request from the host computer 20, such as when the host computer 20 is polling each node on the network, the physical node can simply transmit the requested message to its mirror image in the host computer 20.

Also, when a request has been directed to the software entity, the software entity knows that it has a hardware counterpart out on the Echelon network. Consequently, the software entity will send a message to its physical node out on the network and asks the physical node for the requested information. The physical node will then respond and relay the message back to its mirror image software entity.

As a result, the software entities inherently know to request information from their mirror image physical nodes and the physical nodes inherently know to send the information to their mirror image software entities. The use of mirror image software entities greatly simplifies the transmission of messages from physical nodes since the physical nodes only need to transmit messages to their respective software entities and do not need to know the ultimate destination of the message.

An additional benefit of the use a mirror image software entity for each hardware node is that the home automation system is compatible with the prior art home automation system. While the prior art home automation system did have some software objects that represented physical nodes, there was not a one-to-one mapping as in the invention.

After the domain segment, the next part of the address is the node ID segment which is a 7-bit number used to identify the node. The node ID segment is used to identify each application node out on the system and can be any number from 0 to 126. The node ID segment number 127 is reserved for the host computer 20 and is a fixed address in the system.

The type segment is an 8-bit number having valid numbers ranging from 1 through 253. The type segment would be the same for similar nodes. For instance, all thermostat control nodes would have the same type segment. Also, all nodes that monitor intrusion sensors would all have the same type segment and would be different than the type segment for the thermostat control nodes. Accordingly, the type segment logically groups similar nodes together and the node ID segment distinguishes different nodes having the same type segment.

The subtype segment of the address identifies the hardware that is connected to the node. The subtype segment is applicable when a single node is responsible for more than one type of action or more than one type of hardware. For instance, a single node might have both an analog input card and a digital input card. The subtype segment would be used to tell the node whether the message is intended for the analog input card or the digital input card. The subtype segment, for instance, may be an analog input card, a digital input card, an analog output card, or a digital output card.

The board segment is applicable to those nodes that have more than one board connected to them. For instance, a single node in the security system may have an analog input card or a digital input card. While the subtype segment would provide a description of the type of device, such as an analog input card or a digital input card, the board number is used to identify the physical location of the particular device. For instance, the board segment might identify a digital input card at slot 2 of the node and an analog input card at slot 3 of the node.

The connection segment identifies the particular channel being addressed. For instance, a digital input card may have a plurality of channels with each one associated with a different window intrusion sensor. The connection segment would then provide a different address for each sensor on that digital input card.

Since each hardware device has a unique address, the host computer 20 can monitor the status of every hardware device. For instance, the address for a particular window intrusion sensor would contain a domain segment identifying the sensor as a hardware device, a node ID segment that uniquely identifies the node, a type segment indicating that the node is one that monitors security sensors, a subtype segment that identifies the digital input card to which the window intrusion sensor is connected, a board segment which identifies the physical location of the digital input card, and a connection segment which identifies which channel on the board the sensor is located.

With such a addressing scheme, the host computer 20 can broadcast messages to a common group of devices. For instance, all of the nodes which share a common type segment are considered a subnet and the host computer 20 could broadcast a message to all of these nodes in the subnet with a single transmission. It is also possible to broadcast messages to every node on the network and not just to all nodes in a certain subnet. The broadcasting feature saves time since the host computer 20 need not separately transmit a plurality of messages.

The use of the various segments in the address also allows the host computer 20 to check the status of the network and to determine the configuration of the network. For instance, by using the domain, node ID, type, and subtype segments, the host computer 20 can poll a node and address a digital card. If that node does not have a digital card connected to it, the host computer 20 will receive a reply message indicating such a fact. Depending upon the programming of the host computer 20, the host computer 20 will then, for instance, update its file or it might automatically dial a service center to report the discrepancy.

In contrast to the prior art system that used a command byte, a node byte, and a data byte, the addresses of the invention are comprised of the above-described destination address that contains a plurality of segments, such as the type segment, the subtype segment, the board segment, and the connection segment. The addressing scheme of the invention also comprises a source address, which is a multi-byte address indicating the transmitter of the message.

The addressing scheme also uses a message type to identify the type of message that is being transmitted. The message type is a two-byte segment that identifies up to 65,536 different types of messages. An example of a message types is the reset message. Other message types could include one for turning on lights, one for turning off lights, one for turning on the HVAC (Heating, Ventilating, Air Conditioning) system, or one for turning off an entertainment system.

In addition to the source address, destination address, message type, the message scheme also comprises a data length segment. The data length segment indicates the number of bytes in the entire message. The data length segment is then followed by the actual data. As an example, the data length is limited to 22 bytes of data per message. However, other systems may have smaller or larger maximum number of data bytes to suit their particular system. For instance, other systems may require more data bytes if their displays require more data.

The invention also uses a request/acknowledge mechanism. Once a message has been transmitted from a "source" node to a "destination" node, the destination node sends an acknowledgement message back to the source node. If the acknowledgement message is not received within a certain period of time, the source node retransmits its message a predetermined number of times until the acknowledgement message is received. The source node will abort trying to transmit the message after this predetermined number of times.

Figure 9:
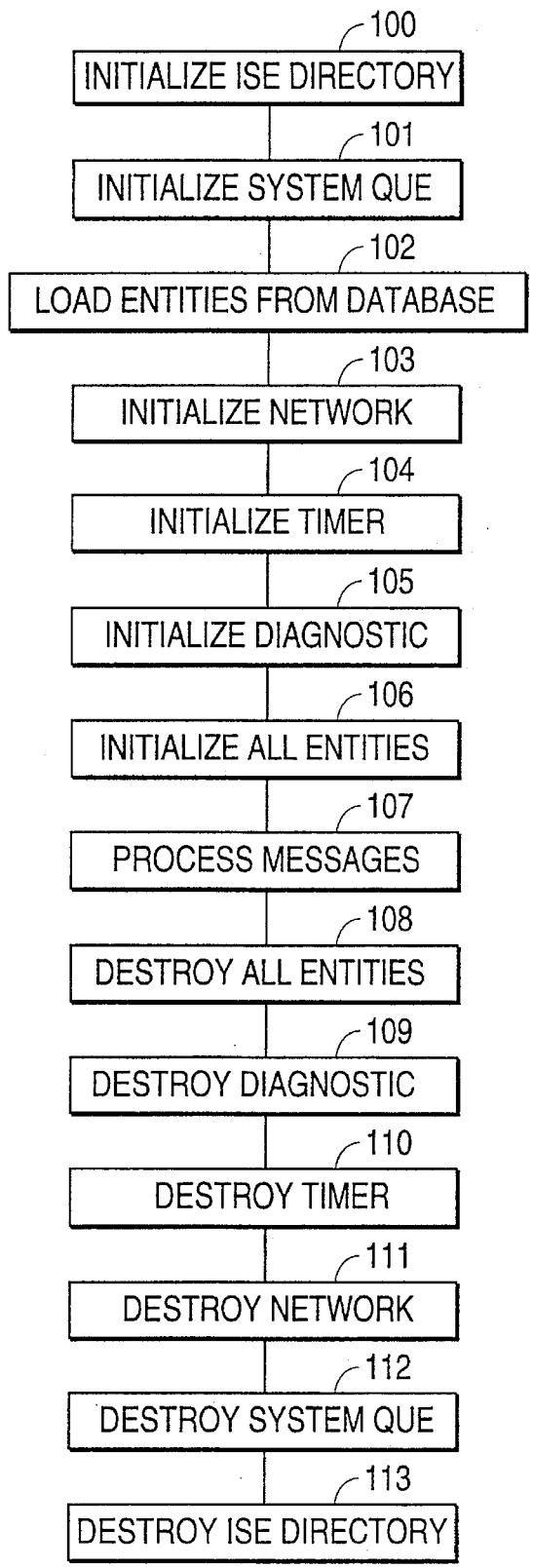
FIG. 9 is a flow chart illustrating a run time diagram for the host computer.

FIG. 9 illustrates a run-time life diagram for the host computer 20. At a step 100, an ISE directory is initialized. The ISE directory contains a list of all hardware entities and software entities for the entire system and is contained within an ASCII text based file, which makes it very easy to manipulate and change the system configuration. At a step 101, the system queue, which manages the handling and routing of messages, is initialized. At a step 102, the host computer 20 loads entities from a database. At this step, the host computer 20 determines the configuration of the system.

At steps 103 to 105, the network, the timer, and the diagnostic system are respectively initialized. The diagnostic system comprises a plurality of software objects for respectively handling diagnostic messages sent from a respective plurality of nodes on the network. A diagnostic message, for example, would be sent from a particular node if the host computer 20 addressed a device that was not connected to that node.

At a step 106, the host computer 20 sends an initialize message to each software entity or hardware entity on the system. The initialize message will cause every entity on the network to be placed in their initial state so that they are ready to perform their normal duties and so that they are ready to transmit or receive messages.

Finally, at a step 107, the host computer 20 and the system are ready to process messages. As shown in more detail in FIG. 10, the processing loop represented at step 107 in FIG. 9 is comprised of a step 200 of evaluating all network events. At a step 201, the host computer 20 evaluates timer events to determine whether any timers have expired and to check on all time of day events. For instance, at step 201, the host computer 20 might determine that a timer has expired and that a certain light needs to be turned on or off.

At a step 202, the host computer 20 pulls a message from the system queue and processes the message. In response to the received message, the host computer 20 may transmit a message to an entity on the network at a step 203. The entity, which may comprise a software entity, will then process the message received from the host computer 20 at a step 204. The processing loop then reverts back to the first step 200 where the host computer 20 again evaluates network events. The host computer 20 will loop through the steps in FIG. 10 during the normal operations of the system.

The system may have to be brought down, for instance, in order to service the system. To shut the system down, at a step 108, the host computer 20 first transmits a destroy message to all entities in order to free the memory in these entities. In the following steps 109 to 113, the host computer 20 will destroy the diagnostic object by freeing this memory, will destroy all timers, will destroy the network, and will then destroy the network queue. By destroying the components on the system, the host computer 20 methodically shuts down the system by placing the system components in a state whereby the system may be smoothly re-booted.

Figure 10:
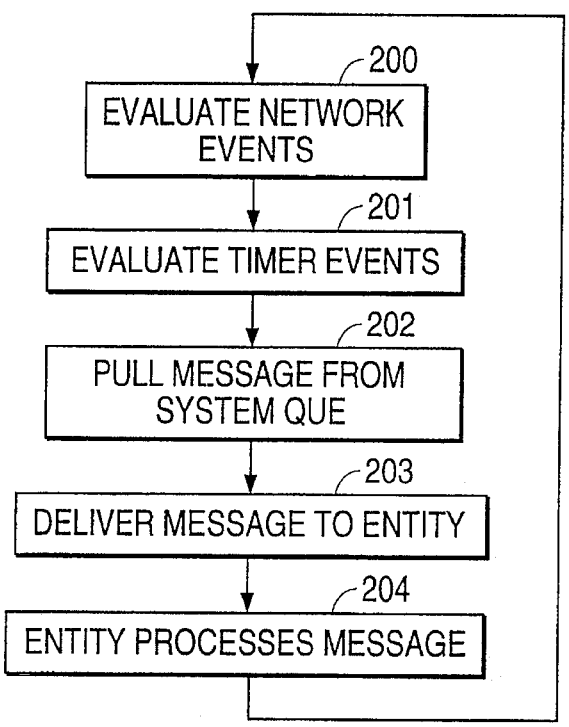
FIG. 10 is a flow chart illustrating an event processing loop for the host computer.

While the host computer 20 is running through the process loop shown in FIG. 10, the other nodes on the network are performing their normal processing. For instance, if the node was a keypad station, the node would be scanning the keys to determine whether a key has been pressed. If the node is responsible for security sensors, the node would scan the sensors to determine whether an event has violated any one of those sensors. Also, if the node is in the HVAC system, this node might be reading the temperatures to determine whether the air conditioning, heating unit, or ventilating unit needs to be activated.

Figure 11:
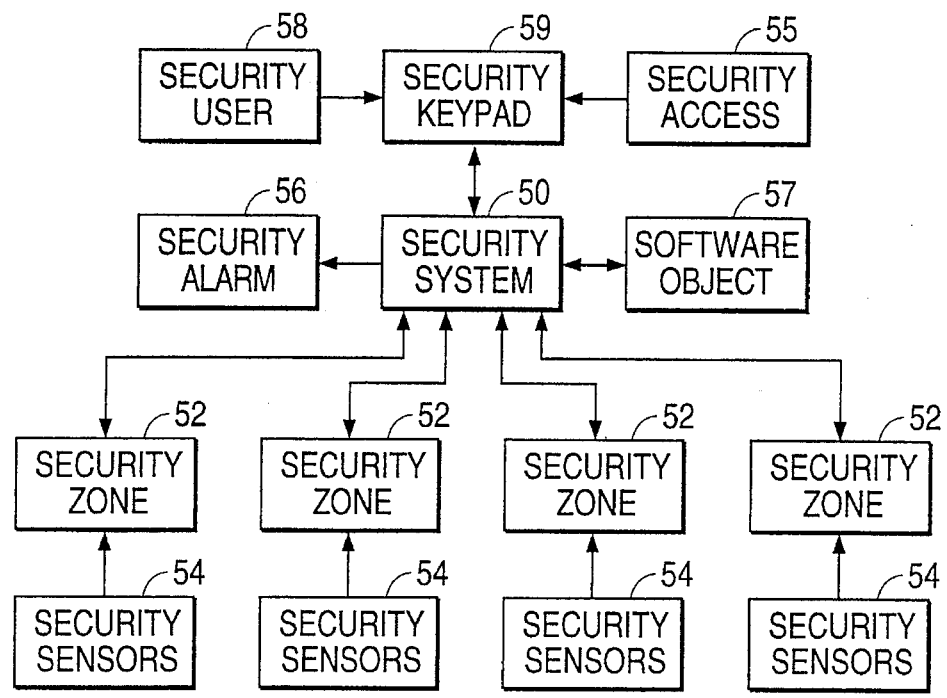
FIG. 11 is a block diagram of a home security sub-system in the home automation system.

The home automation system is comprised of a number of sub-systems. These sub-systems may include a home security sub-system, an HVAC sub-system, a lighting control sub-system, an entertainment sub-system, as well as other sub-systems. For instance, with reference to FIG. 11, an embodiment of a home security sub-system comprises a security system software object 50 responsible for the security sub-system. This security system software object 50 is in a node and communicates with the security system's mirror image software object 57 in the host computer 20. The security system object 50 is connected to at least one security alarm 56, to at least one security keypad 59, and to a plurality of security zones 52.

Figure 12:
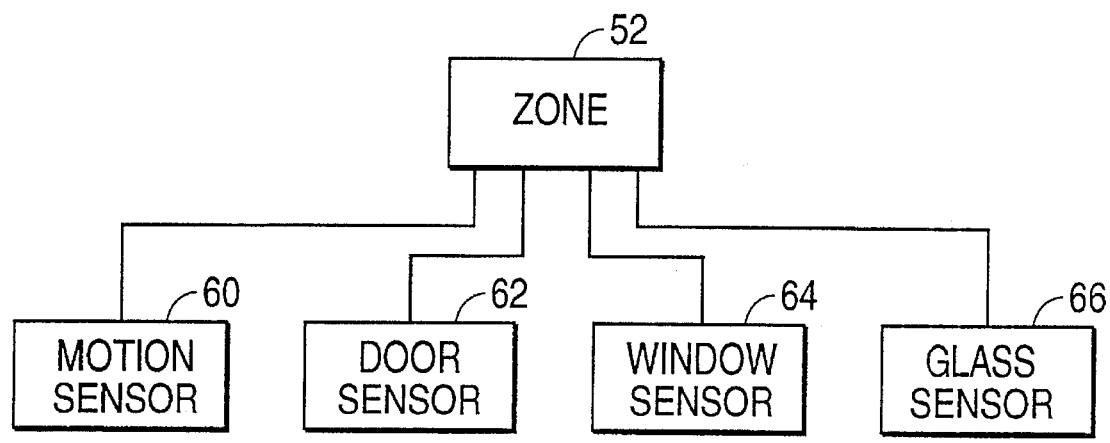
FIG. 12 is a block diagram of an embodiment of a zone in the home security sub-system.

A zone 52 is defined to be a collection or grouping of entities, such as a collection of hardware devices. For instance, with reference to FIG. 12, a zone 52 may comprise a motion sensor 60, a door sensor 62, a window sensor 64, and a glass breakage detector 66, all of which may be located in a single room. Other zones 52 could therefore be located in other rooms whereby each room or area of the house is defined by a distinct zone 52.

Figure 13:
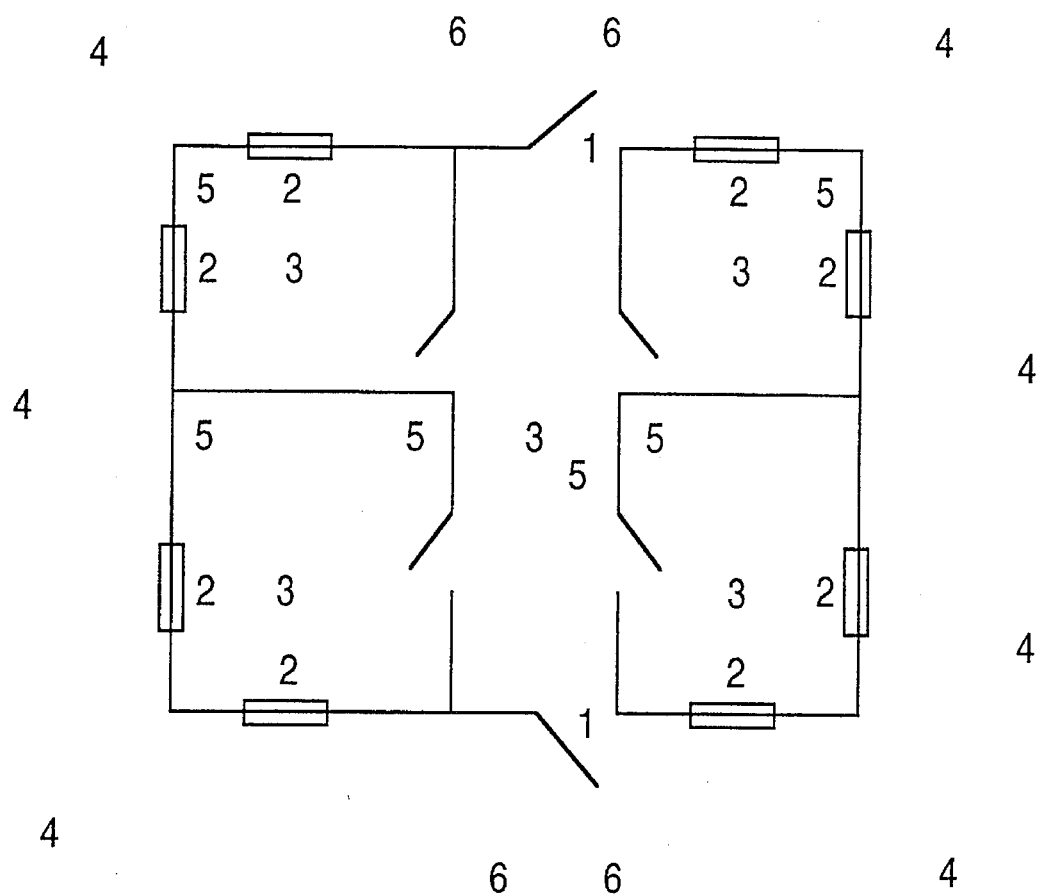
FIG. 13 is an exemplary house layout depicting a second embodiment of the zones in the home security sub-system.

Alternatively, a first security zone 52 may comprise a node that monitors all of the door intrusion sensors while a second security zone 52 may comprise a node that monitors all of the window intrusion sensors. FIG. 13 illustrates an exemplary layout of the zones 52 in a house. As shown in the figure, a first zone is comprised of all door intrusion sensors 1, a second zone encompasses all window intrusion sensors 2, a third zone is defined to include all fire sensors 3, a fourth zone contains exterior motion detectors 4, a fifth zone contains interior motion detectors 5, and a sixth zone comprises motion sensors located along a pathway to the house 6.

After a sensor detects an event, the node to which the sensor is connected will transmit a message to the host computer 20 informing the host computer 20 the type of message and the location of the event. The host computer 20 will process the received message and, based upon the set up of the system, the host computer 20 may transmit one or more messages to some components on the system. These messages might trigger warning signals if an intruder is approaching the perimeter of the house or they might trigger alarm signals if the intruder attempts to enter the house. Also, the messages might trigger a unique signal in response to a unique event, such as a fire alarm in response to the detection of smoke or fire.

For instance, if a motion detector in zone 6 transmits a message to the host computer 20 indicating a detected motion, the host computer 20 might transmit a message to the lighting control sub-system to turn on a light along the pathway. Also, if an exterior motion detector in zone 4 transmits a message to the host computer 20 indicating a detected motion, the host computer 20 might transmit a message to the lighting control sub-system to turn on a spot light and might also transmit a message to a security alarm 56 to broadcast a warning message to the intruder. Further, if a window intrusion sensor in zone 2 transmits a message to the host computer 20 indicating a detected intrusion, the host computer 20 may then transmit a message to a security alarm 56 in the security sub-system to emit a siren, a message to the lighting control sub-system to turn on lights, and a message to an auto-dialer 23 to notify the police.

Figure 14A:
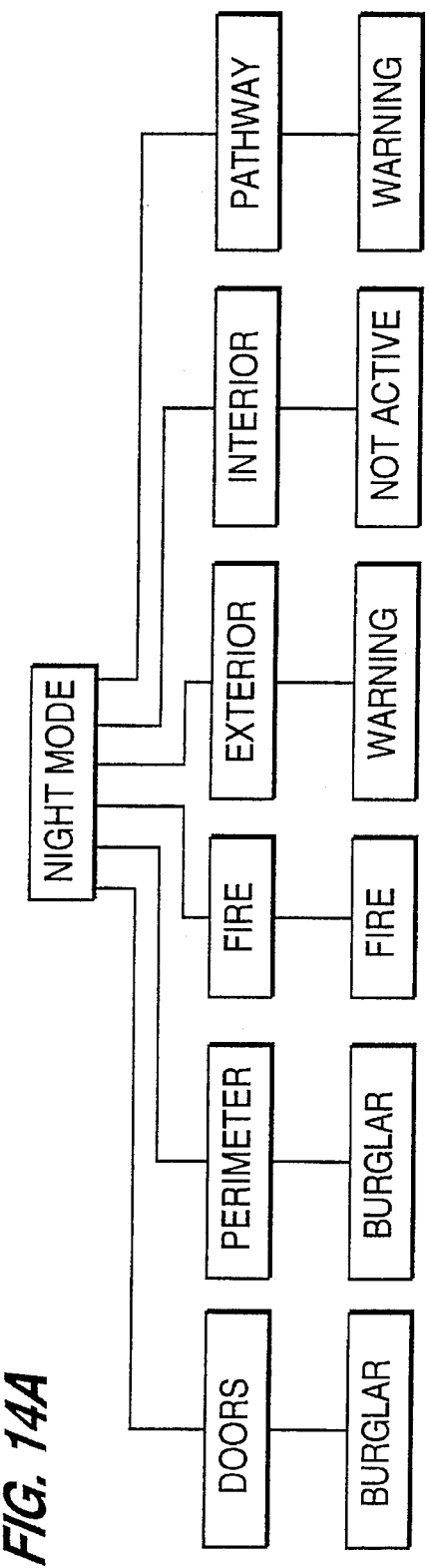
FIGS. 14A, 14B, and 14C depict possible modes of operation for the home security sub-system.

The particular action that the host computer 20 takes in response to an event depends in part upon the mode of operation of the security sub-system. As an example, FIG. 14A illustrates a night mode of operation where the interior motion sensors do not trigger any response, the exterior motion sensors and the pathway motion sensors are set to trigger warning signals, the fire sensors are set to trigger a fire alarm, and the doors and window sensors are set to trigger burglar signals.

Figure 14B:
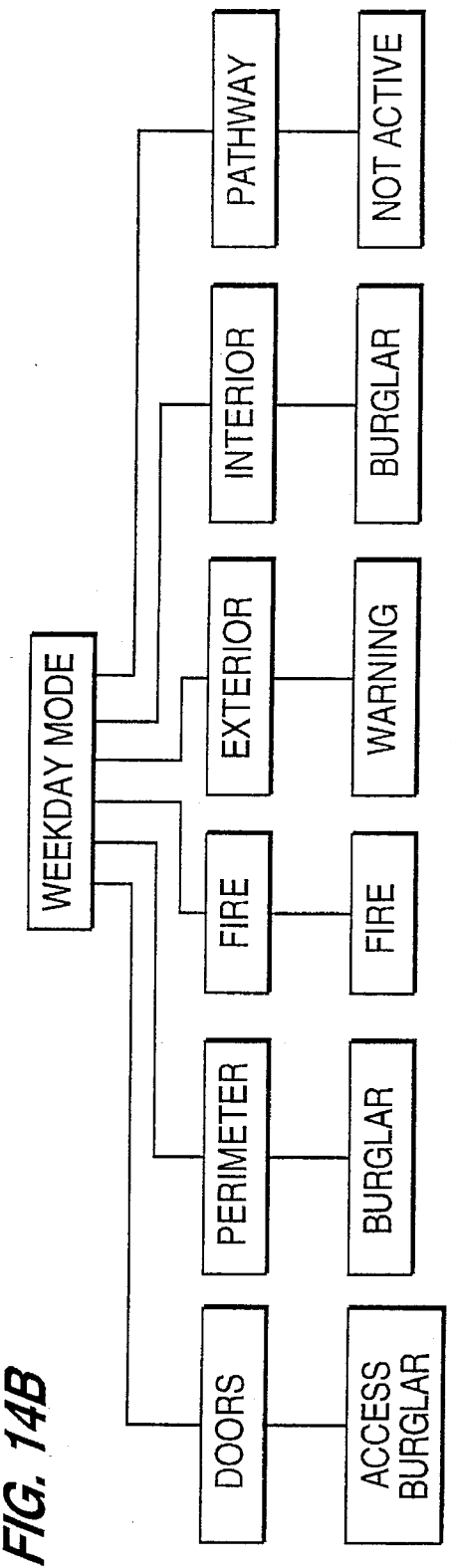

A weekday mode, an example of which is shown in FIG. 14B, may differ from the night mode in that the pathway sensors do not trigger any signals so as to provide the mailman and other people limited access to the front door. The weekday mode would also differ from the night mode in that the interior motion sensors would be activated to trigger burglar signals in response to the detection of motion. Additionally, the doors in the weekday mode would allow people to enter if they enter an access code at a keypad. Therefore, a maid would be able to gain access into the house without triggering any alarm signals. The maid or anyone else who enters an access code, however, would only be able to arm or disarm only those zones which can be accessed with the access code, such as all door sensors and all interior motion detectors. While the home owner can control all modes by entering his/her user code, a person with just an access code can only arm or disarm a limited number of areas and thus can be excluded from certain areas of the house.

Figure 14C:
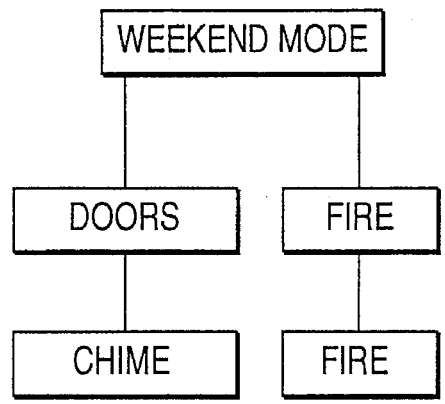

A third mode of operation is a weekend mode, an example of which is shown in FIG. 14C. This mode disarms most of the sensors so that a detection of an event would not trigger any response. The weekend mode would still keep the fire sensor active and could also automatically cause a door bell to chime when a door sensor detects the opening of a door.

Figure 15:
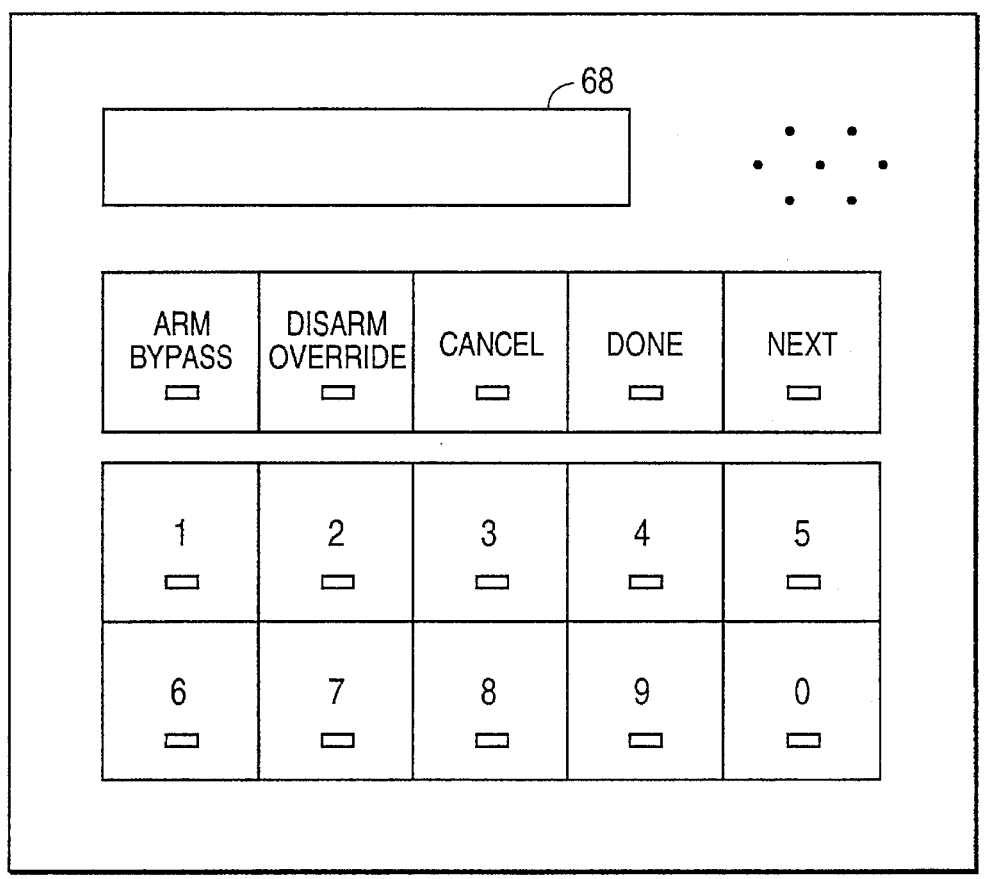
FIG. 15 is a schematic of a keypad interface for the home security sub-system.

A keypad for the security system is shown in FIG. 15. The keypad has an LCD display 68 for providing instructions to the user and each button on the keypad has an associated LED that is lit in order to provide feedback to the user. The keypad comprises ten keys numbered 0 through 9 which are used by residents of the house to enter the user code and is used by those who have been given an access code to enter the access code. Other buttons include an "Arm/Bypass" button, a "Disarm/Override" button, a "Cancel" button, a "Done" button, and a "Next" button. The security keypad also has a speaker unit that provides audible feedback to the user and which could also be connected to an intercom system.

Figure 16:
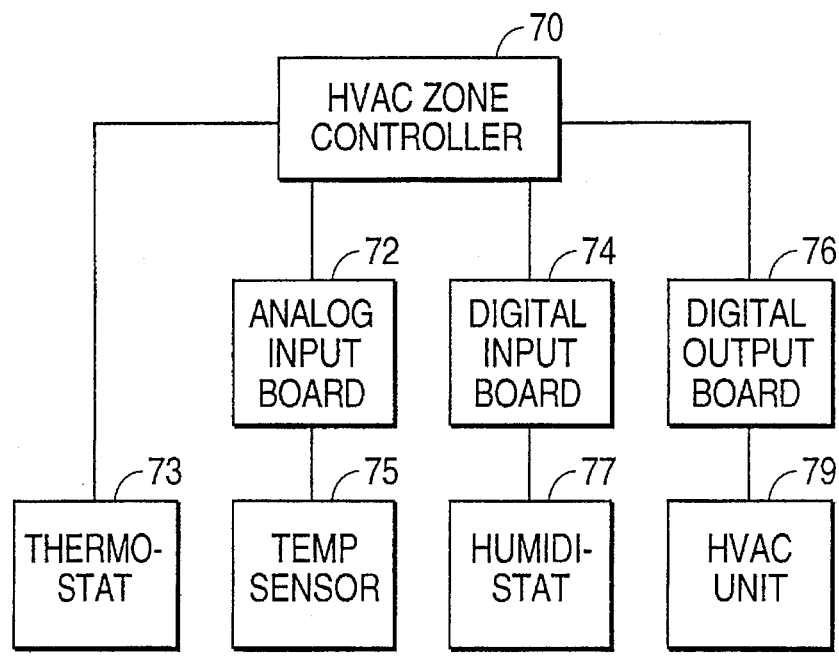
FIG. 16 is a block diagram of an environmental control sub-system.

FIG. 16 is a block diagram which represents a system for maintaining a desired climate in a particular closed environment of "HVAC zone" in which the climate is maintained by a heating ventilating and air conditioning (HVAC) unit 79. Each HVAC zone may comprise a microprocessor which in turn may be a component of a network controlled by a host computer 20. As shown in the drawing, the HVAC zone controller 70 is coupled to a thermostat 73 by which a user may set the desired temperature and humidity levels. The controller 70 is additionally coupled to the temperature sensor 75 via an analog board input 72. The controller 70 is further coupled to a humidistat 77 through a digital input board 74, as well as to the HVAC unit 79 via a digital output board 76.

According to this arrangement, a user may set desired temperature and humidity levels respectively with the thermostat 73 and humidistat 77. The HVAC controller 70 then compares the desired setting with the settings obtained from the temperature sensor 73 and the humidistat 77 and outputs control signals to raise or lower temperature and humidity level with the HVAC unit 79.

Figure 17:
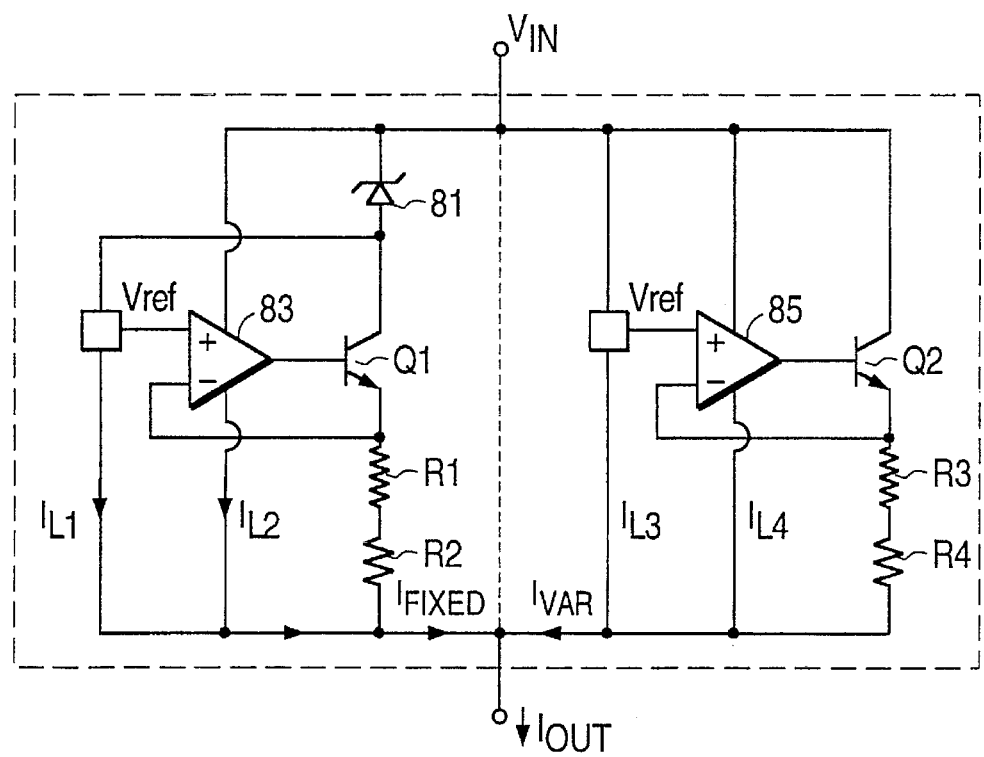
FIG. 17 is a schematic of a temperature sensing circuit.

FIG. 17 is a circuit diagram showing an arrangement by which a temperature-dependent current $I_{out}$ may be provided to an interface device thereby indicating the precise temperature over a fixed, predetermined range. This circuit includes two sections which provide respectively a fixed current source and a temperature-dependent variable current source. The fixed current source maintains a minimum current $I_{FIXED}$ through the circuit which is added as an offset to the current $I_{VAR}$ provided by the temperature dependent portion. Thus, the temperature dependent portion is designed to vary linearly over a predetermined range of temperatures.

The fixed current source portion comprises a precision voltage source coupled with an operational amplifier 83, a zener diode 81, a transistor Q1 and two precision resistors R1 and R2. The voltage source provides a fixed voltage to the noninverting input of the operational amplifier 83. The output of the operational amplifier 83 is connected to the base of the transistor Q1 and the inverting input of the operational amplifier 83 is connected to the emitter of the transistor Q1. Together with the precision resistors R1 and R2, the operational amplifier 83 and the transistor Q1 convert the precise voltage of the voltage source to a precise fixed current, $I_{FIXED}$.

The supply terminals of both the voltage source and the operational amplifier 83 are connected to the analog board 72. In the example shown, the supply of the voltage sensor is connected through a zener diode 81 which limits the voltage supplied to the voltage sensor to prevent overload. In this way, the circuit remains non-operational until a pulsing supply voltage is supplied to the active devices. THUS, the circuit does not generate heat which could introduce error into the reading.

While some leakage current $I_{L1}$ and $I_{L2}$ is introduced into the circuit, the value of the resistors R1 and R2 and of the voltage provided by voltage sensor can be selected to provide sufficient current such that the leakage current introduces a minimum error which is acceptable. In a preferred embodiment, the voltage sensor provides 2.50 V across two resistors R1 and R2 in series having values of 324Ω±1% and 301Ω±1% with leakage current from the voltage sensor and the operational amplifier 83 providing respectively 10 μA and 80 μA. Thus, the circuit provides a fixed 4 mA current within a range of ±90

The temperature dependent portion of the circuit is similarly constructed except a variable voltage sensor is utilized in place of the fixed voltage sensor of the fixed current source portion. This variable voltage sensor is selected to provide a voltage $V_{VAR}$ which varies linearly over a fixed range of temperatures. In a preferred embodiment, the variable sensor provided a range of 0 to 1 V respectively over a range of temperatures from 0° to 100° F. This varying voltage is converted to a precise, temperature dependent current $I_{VAR}$ by the operational amplifier 85 and transistor Q2 which are coupled to the precision resistors R3 and R4.

In a preferred embodiment, the variable sensor provided a range of voltages from 0 to 1 respectively over a range of temperatures from 0° F. to 100° F. which is placed across a resistors R3 and R4 having values of 32.4Ω±1% and 30.1Ω±1%. The voltage sensor and the operational amplifier 85 introduce respective leakage currents $I_{L3}$ and $I_{L4}$ of 20 μA and 80 μA. Thus, a variable current $I_{VAR}$ is supplied which ranges from 0 to 16 mA respectively over a temperature of 0° to 100° F. Therefore, because the offset current $I_{FIXED}$ is known, a precise temperature may be determined within an acceptable range of error.

As in the fixed portion, the variable voltage sensor and the operational amplifier 85 are supplied by the analog board input 72. Thus, the circuit remains off until all active components are pulsed with a supply voltage. By selecting the pulse to be of sufficient low frequency, error from heating of the active components, particular the variable temperature sensor is reduced. Generally, the duty cycle is selected to be just sufficient to obtain an accurate reading.

Apart from reducing error by heating of active components, the use of a current signal according to the present invention permits the sensing circuit to be removed from the remainder of the system without the introduction of unwanted noise.

Figure 18:
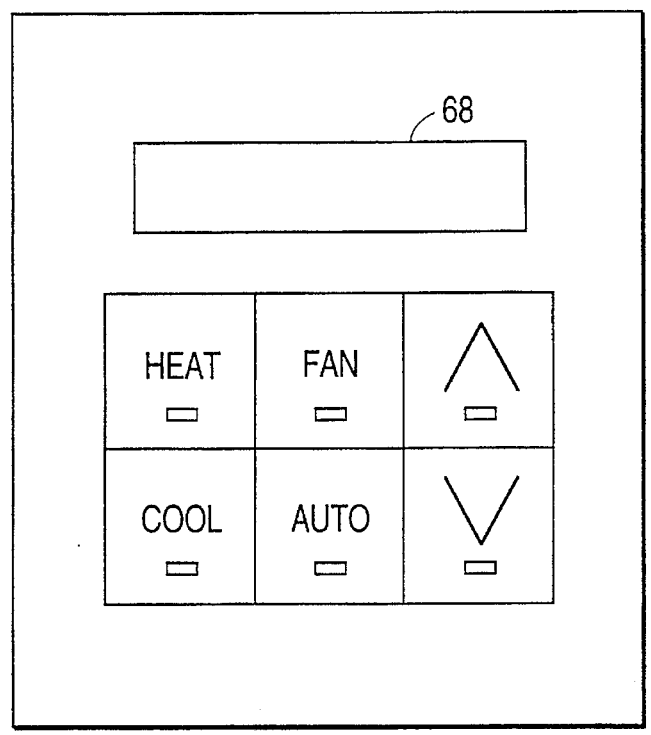
FIG. 18 is a schematic of a keypad interface for the environmental control sub-system.

A keypad for the HVAC sub-system is shown in FIG. 18. The keypad comprises a "Heat" button for controlling the heating unit, a "Cool" button for controlling the air conditioning unit, a "Fan" button for controlling the ventilating unit, and an "Auto" button for placing the sub-system in an automatic mode of operation. The keypad also comprises an up arrow button, a down button arrow, and an LCD display 68. Each of the buttons on the keypad has an associated LED for providing visual feedback to the user.

Figure 19:
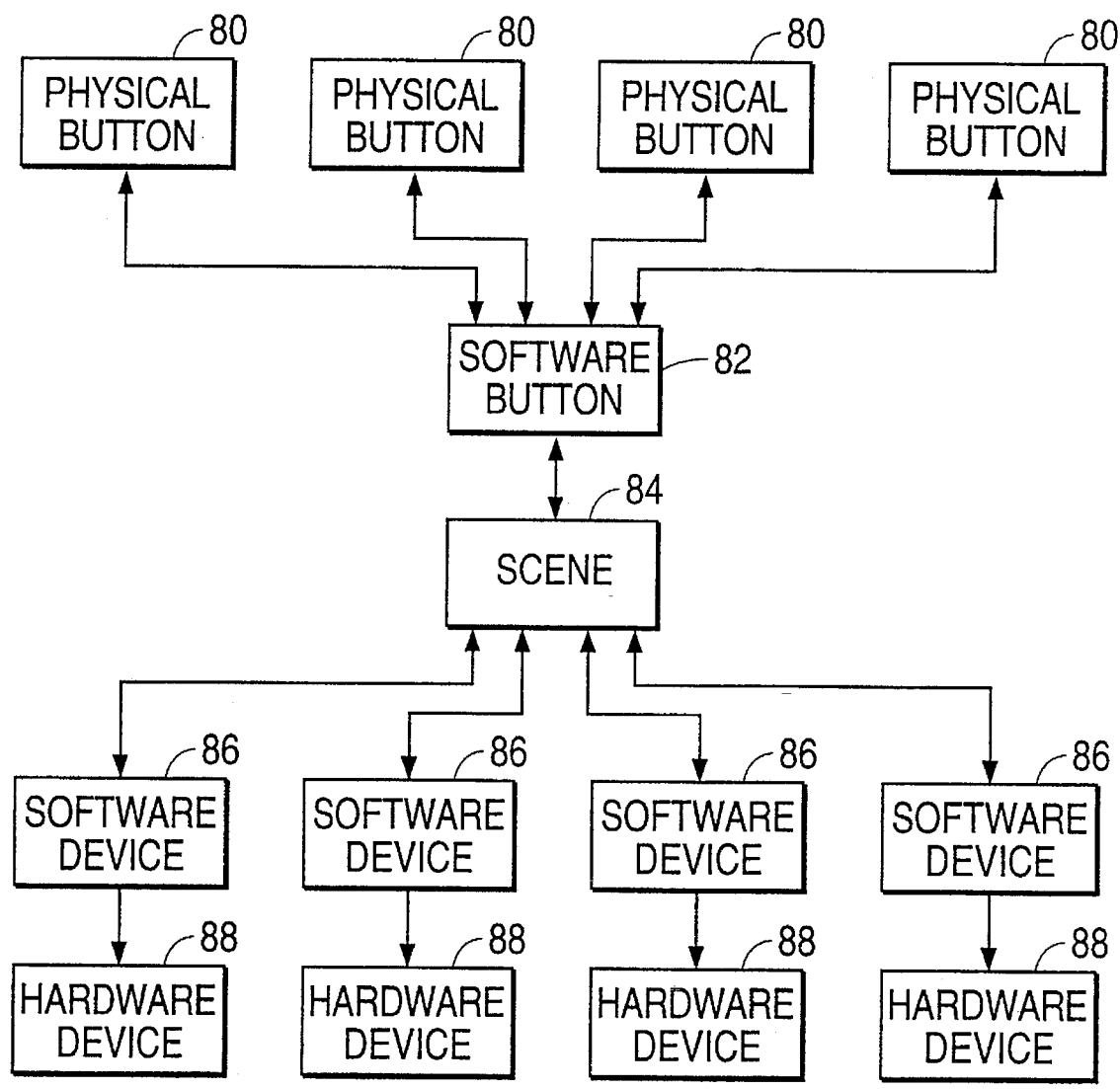
FIG. 19 is a block diagram of a lighting control sub-system.

An example of the lighting sub-system is shown in FIG. 19. The lighting sub-system employs at least one keypad station having a number of physical buttons 80. Each physical button 80 communicates with a software button 82 on its respective node, which then communicates with its mirror image software object in the host computer 20. The software in the node monitors the physical button 80 and transmits messages to the mirror image software button 82 in the host computer 20. In this example, the software button 82 communicates with a scene 84 in the host computer 20. Based upon the received message from the software button 82, the host computer 20 transmits one or more messages to software devices 86, or software entities, which then control a respective number of hardware devices 88.

For instance, a physical button 80 may be assigned to a certain light, such as the kitchen light. When the software at that node detects the depression of a physical button 80, the node transmits a message to its mirror image software button 82 in the host computer 20 informing the host computer 20 that the button 80 has been depressed. The host computer 20 would then transmit a message to a software device 86 associated with the kitchen light 88. This software device 86 would then send signals to the hardware device 88 in order to toggle the kitchen light 88 on or off. In addition to simply toggling the light 88 on or off, the software device 86 also controls the intensity of the light 88.

Rather than having a physical button 80 assigned to one light 88, a physical button 80 may instead be assigned to a scene 84. A scene 84 has associated with it a list of commands that are executed in the host computer 20 and which affect a plurality of hardware devices 88. For instance, in the lighting sub-system, a scene 84 button may cause certain lights 88 in a room to turn on to certain levels and would turn off other lights 88 in the room. A scene 84, however, is not limited to just the control of similar hardware devices 88, but can instead be used to control a number of lights 88, the entertainment sub-system, the HVAC sub-system, as well as additional devices.

Figure 20:
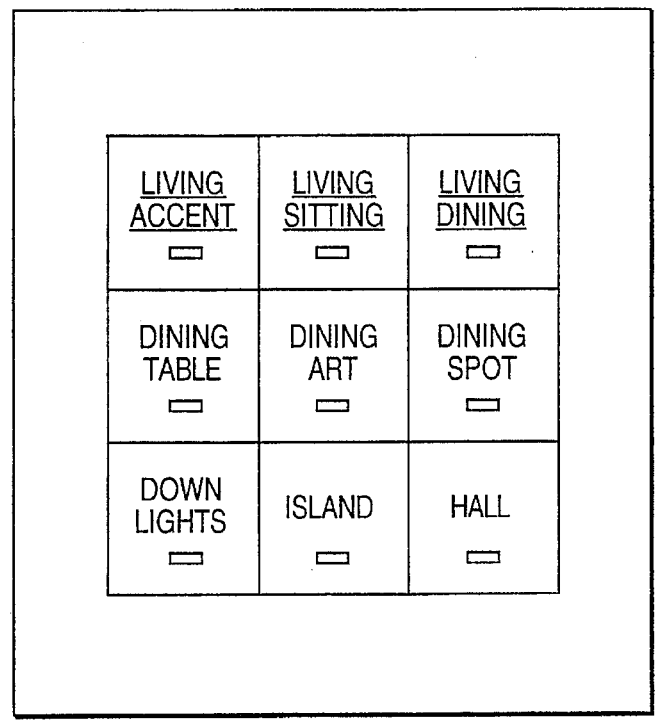
FIG. 20 is a schematic of a keypad interface for the lighting control sub-system.

A keypad for the lighting sub-system is shown in FIG. 20. In this example, the keypad is a 9 button keypad with each button having an associated LED. While a 9 button keypad is depicted, the system could use keypads with more or fewer numbers of keys, such as a 3 button keypad or a 6 button keypad. Six of the buttons in the keypad of FIG. 20 are dedicated to one or more lights. To serve merely as an example, these dedicated light buttons are the "Dining Table" button, the "Dining Art" button, the "Dining Spot" button, the "Down Lights" button, the "Island" button, and the "Hall" button. Thus, for instance, the "Hall" button is used to turn the lights in the hall on, off, or to adjust the intensity of these lights. The other buttons similarly control their respective lights.

In addition to the six dedicated buttons, the keypad also has three scene buttons: a "Living Accent" scene button, a "Living Sitting" scene button, and a "Living Dining" scene button. These scene buttons control a number of lights to create the particular scene assigned to the button. For instance, the "Living Accent" scene may turn on the "Dining Art" light to highlight pieces of art and it may turn on the "Dining Spot" light to place a spot light on the dining room table. The "Living Dining" scene may softly turn on the "Dining Table" light while turning off most other lights. Other variations on the control of the lights with a scene button are also possible. For example, a scene can have devices from any location in the house and from devices other than lights.

In contrast to the prior art home automation systems, which were a collection of sub-systems having different user interfaces, the home automation system of the invention uses a single interface. The interface is logically and rigidly consistent, is easy to use, yet is flexible enough to allow users to make changes in the system without having to use a computer or to call a technician. This single interface is used to control all sub-systems, including the lighting control sub-system, the security sub-system, the HVAC sub-system, as well as other sub-systems.

A single physical control system for providing this single interface is comprised of several types logical objects. One type of logical object is a device object where a set of buttons acting as one are linked to the control of an entity. Devices are generally classified into adjustable devices and on/off devices. For instance, the device logical object may be used to control electrical loads such as lights or fans, the volume of audio signals in different zones, an audio or video source, the temperature or humidity in a zone, an alarm, a clock, an intercom, a speakerphone, or two way motors for the control of drapes or lifts.

Two other types of logical objects are scenes and scene sets. A scene is a set of buttons acting as one which are linked to the control of a collection of devices. For instance, as discussed above with reference to FIG. 20, a lighting scene may commonly control a number of lights. A scene set is defined as a set of buttons acting as one which are linked to the control of a collection of scenes.

Another logical object is a security mode. A security mode can be entered only after a user types in a proper access code. With a proper access code, a user can define a collection of security zones and responses and can define scene sets and scenes for a particular security mode.

The home automation system utilizes a consistent approach for conveying information concerning the type of the logical object. For instance, all devices are labelled on a button with capitalized black lettering, all scenes are labelled with underlined black lettering, scene sets are labelled with underlined capitalized blue lettering, and security modes are labelled with underlined capitalized maroon lettering and with LCD read outs. If all capital letters are used in labelling, then that object is capable of being time delayed. If the object is an on-only device, then a dot will appear in the upper right hand corner of the button.

The home automation system also utilizes a consistent approach for conveying the exact state of an object. Each button on a button interface has an associated LED for indicating the exact status of its associated logical object. For instance, a solid on/off LED respectively indicates whether the object is on or off. A rapidly flashing LED, which is approximately on for 1 second and off for 1 second, indicates that the object is a slave that is part of a master object.

A pattern flashing "tuning" LED, which is approximately on for a half second and off for a half second, indicates that the object is a master that is being tuned to have slaves assigned to that object. Thus, depending on the flash pattern of the LED, one can tell whether the scene or scene set is a master or slave.

A slowly flashing LED, which is approximately in one state for five seconds and then in the other state for one second, indicates that a timer has been activated for that object. The LED will be on for five seconds and off for one second to indicate that the timer will turn off that object at the end of the time out period and will be off for five seconds and on for one second to indicate that the timer will turn on that object at the end of the time out period.

In addition to the above states ascertainable by the LEDs, a pattern flashing "problem" LED, which is defined by four flashes followed by ten seconds of off time, is used to indicate that a diagnostic program has identified a problem with that object. Also, a pulsed flash LED indicates the setting of a parameter of an object. For instance, two pulses would be used to denote a parameter value of two. Additionally, the top left LED of each keypad will be dimly lit when all of the LEDs on the keypad are off in order to indicate the location of the keypad in the room.

A significant feature of the home automation system is that it utilizes a consistent set of rules for operating and controlling the various logical objects. First with reference to devices, a device is turned on or off by toggling its associated button. To change a parameter of a device, the button is held down past a predetermined time out period, which is adjustable and typically a one-half second, and the intensity of the device starts to increase. Once a desired intensity is reached, the user simply lifts the finger off of the button and the intensity of the device remains at that level. If the user desires to set the device at full intensity, the user holds the button down until the intensity reaches the full intensity level. While prior systems start decreasing the intensity after reaching 100%, the invention remains at the 100% level even though the button is still depressed.

To decrease the intensity of a device, the user first holds down the button past the time out period. At this point, the intensity starts to increase. The user then removes the finger off of the button and then holds the button down again to start decreasing the intensity. Once a desired intensity is reached, the user simply removes the finger from the button. Once the intensity of a device has been increased, the user must depress the button within ten seconds in order to decrease the intensity. This certain amount of time is provided so that a user knows that an unused keypad will first start to increase after a button has been depressed past the time out period. This amount of time therefore provides a consistent programming approach to each keypad.

For adjustable value devices, a ramp speed can also be adjusted. The ramp speed is related to the speed at which values of a parameter are changing as the button is being depressed. To change the ramp speed, the button is triple clicked and the associated LED will pulse back the current ramp speed. Thus, a single flash will indicate a first ramp speed while two flashes will indicate a second ramp speed. The ramp speed can be programmed by triple clicking the button within the time out period. A triple click received after a maximum ramp speed has been entered will place the ramp speed back to the lowest state.

For devices that are not value adjustable devices, a triple click will change a time delay associated with that device. The LED will pulse back the current time delay period with the number of flashes indicating the length of the time delay period. Triple clicking the button within a time out period will increase the time delay period. Once the maximum time out period has been programmed, the next triple click will return the time out period to the lowest value. Non-adjustable devices can also be monitored to ensure that the current changes as it was programmed to change.

With regard to scenes, scene sets, and security modes, tapping an associated button will toggle the object on or off. For a security mode, a proper access mode must first be entered before a security mode can be toggled to its armed state or disarmed state.

To tune a scene, a scene set, or a security mode, the button is held down past the time out period until the LED starts to flash. Once a master object has been placed in the tuning mode, slave logical objects may be added or deleted from the collection by double clicking their buttons. Furthermore, if a device is being added to the object being tuned, the parameter of the device can have its value adjusted. To exit the tuning mode, the flashing button is clicked, thereby defining the logical object by all of its slave objects along with the exact parameter settings for the slave objects.

A scene, scene set, or security mode is therefore defined by the exact state of each of its slave objects. In other words, a scene is defined by the devices assigned to that scene and to the exact values of the devices that were adjusted while in the scene tuning mode. Because a scene, scene set, or security mode is defined by the exact state of its slave objects, an adjustment of a slave object after the activation of a scene, scene set, or security mode will deactivate that scene, scene set, or security mode.

Some objects may have their behavior characteristics slightly modified. For instance, it may be desired to have a button time delay before the status of that object changes. This is in contrast to the typical situation where any toggle of the button will change the status of the object. A button time delay would be advantageous with panic buttons, energy management scenes, large current drawing devices such as water heaters and pool pumps, and slowly operating devices such as front gate access doors.

As another example, it may be desirable to have some objects be on-only objects, which can only be turned on and which cannot be turned off with a subsequent toggling of the button. For instance, some on-only objects may comprise energy management scenes or security modes.

The keypads of the home automation system may also comprise some special control buttons. For instance, a ramp up button and a ramp down button may be provided as an additional manner of adjusting the value of a parameter. The ramp keys can be used to increase or decrease the value of the last activated device. The LED on the ramp key will flash to indicate that the values are being adjusted.

The keypads may also comprise a tuning lock key. If the tuning lock key is toggled on, then objects in the system cannot be tuned. Thus, with the tuning lock key toggled on, scenes, scene sets, and security modes cannot be tuned. With the tuning lock key toggled off, only a single object can be placed into a tuning mode.

A device lock key is an additional key that may be used in the home automation system. If the device lock key is toggled on, then devices cannot be operated from the keypads. The device lock key may also be used to set the global device time out period for adjustable value devices. This global time out period is adjusted by triple clicking the device lock key and is then programmed in the same manner that time delay periods are adjusted with devices.

The home automation system may also comprise a button lock scene key. When the button lock scene key is toggled on, the home automation system will not receive commands from any keypads that were programmed into the button lock scene. The button lock scene key is placed in a tuning mode, as with other scene buttons, by holding down the button past the time out period. Once in the tuning mode, all buttons on a given keypad are added into the scene if a single button is double clicked.

As an example of the single user interface, with reference to the lighting control sub-system, a light can be turned on and off by toggling its associated button. A scene button may be placed in a tuning mode by holding down its associated button past the time out period.

While in the tuning mode, a user can modify the scene to suit his/her own desires by adding or deleting lights from the scene. To add or remove a light from the scene, a user simply double clicks the button for that light and looks at the LED to determine whether the light is part of the scene. While in the tuning mode, the intensity of a light in the scene can be adjusted in the same manner the intensity of a light is adjusted outside of the tuning mode. Thus, while a scene is placed in the tuning mode, a user can add lights to the scene, can remove lights from the scene, and can also adjust the intensities of each light in the scene. To exit the tuning mode, the scene button is tapped.

The same method of programming the light keypad of FIG. 20 also applies to the thermostat keypad of FIG. 18. Thus, in order to turn the heat on or off, the "HEAT" button is toggled. To increase the set point for the heating unit, the user holds the "HEAT" button down pass the time out period and the LCD display indicates that the set point is increasing. The user can decrease the set point by next removing the finger from the button and then again holding the "HEAT" button down. The air conditioning unit can similarly be controlled by activating the "COOL" button. Alternatively, a user can use the ramp up and ramp down keys to set the parameters of the heating system and the parameters of the cooling system.

The same type of programming is also applicable to other sub-systems, such as an entertainment system or an intercom system. For instance, with regard to the intercom system, a keypad may comprise a "LISTEN" button and a "TALK"

button. To increase the volume of a speaker on an intercom unit, the user could simply hold the "LISTEN" button down past the time out period until a desired volume is reached. If the other person has difficulty hearing the user, the user could hold the "TALK" button down to increase the sensitivity of the microphone.

A number of devices may be grouped together in a manner similar to the grouping of lights in a scene. For instance, with the security keypad, a user can define a vacation mode. To define the parameters of the vacation mode, the user can go to the thermostat keypad and double click the "Heat" button in order to incorporate control of the heating unit in with the vacation mode. After double clicking the "Heat" button, the user can define a desired set point for turning on the heat when the user leaves the house for a vacation. The user can also go to the various lighting keypads dispersed throughout the house and double click buttons in order to add or delete lights from the vacation mode. As with the tuning of a scene, the devices that are part of the vacation mode will have their associated LEDs turned on.

In addition to custom designing the scenes and other groupings of devices, the user interface can easily be extended to a diagnostic mode. In such a mode, a technician may exchange the functions of two keys by simultaneously holding down the two keys past the device time out period. The technician might want to exchange the functionality of two keys when the user finds that the location of one key on one keypad would be better placed at another key location, on that keypad or on another keypad. This might also be used when the functionality of two keys have been erroneously assigned to the wrong locations. Further, if the technician does a quadruple click (clicking four times) the system will tell the technician what node the technician is working on.

By using the single interface, a user is truly given control of the entire home automation system. The user needs to only learn a single set of rules for interfacing a sub-system and thus greatly simplifies the use and control of the system. While scenes have been generally described with reference to a number of lights in a scene, a scene could additionally or alternatively include other devices, such as a fan or the control of the volume of an audio device.

Also, the status of an object may be indicated in manners different than that disclosed. For instance, the flashing sequences of the LEDs are not crucial to the invention as long as common states are indicated consistently. Furthermore, an audio indicator could be used to indicate certain states of the objects rather than the LEDs.

An embodiment of the physical interface for any one of the sub-systems will now be described with reference to FIGS. 21A to C and FIGS. 22A to C. The cover of the interface, as shown in FIGS. 22A to 22C, comprises four studs 120 that have been spot welded onto the cover in order to hold printed circuit boards. Preferably, the printed circuit boards are constructed to have holes that mate with the four studs 120 with such a tolerance as to not require any additional adjustment once assembled. The top edge of the cover is preferably bent at an angle of 7° less than a right angle relative to the top of the cover and the bottom edge of the cover has two embosses 122 extending toward the center of the cover. The bottom edge of the cover is also constructed with a slot 124.

Figure 21A:
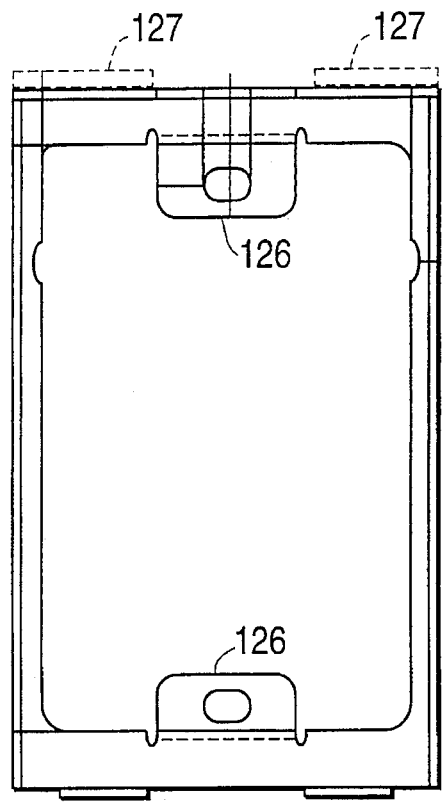
FIGS. 21A, 21B, and 21C are respectively front, side, and bottom views of a backplate for a sub-system interface.
Figure 21B:
Figure 21C:
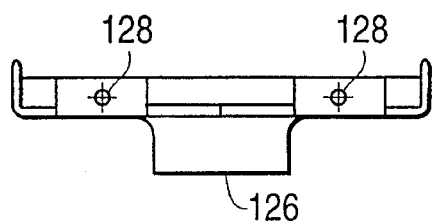
Figure 22A:
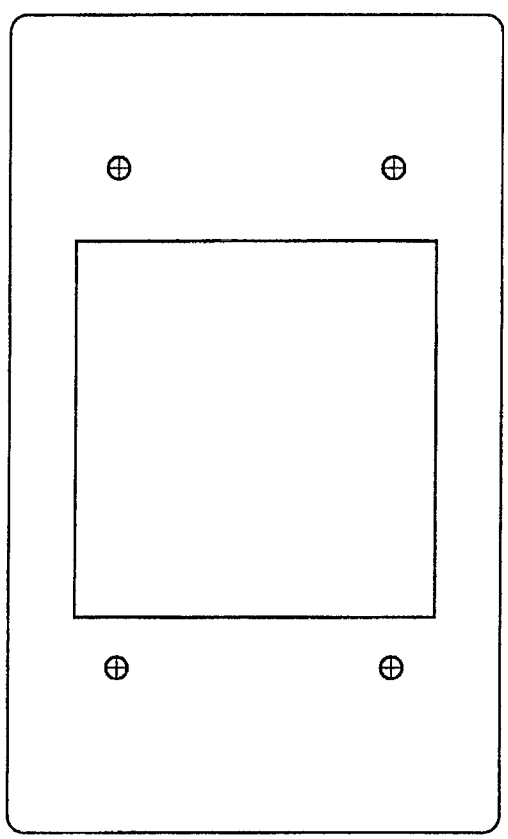
FIGS. 22A, 22B, and 22C are respectively front, side, and bottom views of a cover for a sub-system interface.
Figure 22B:
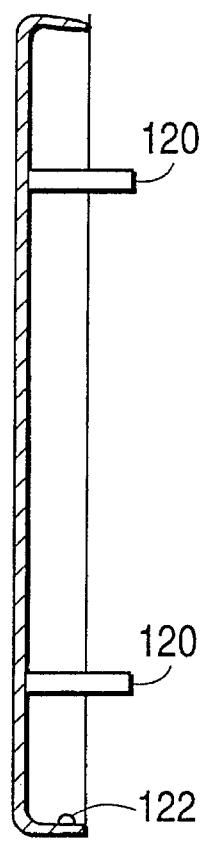
Figure 22C:
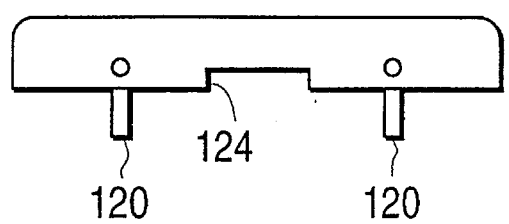

FIGS. 21A to C illustrate a backplate having two L-shaped legs 126 which may be mounted into a standard single or double gang electrical box. The L-shaped legs 126 provide a recessed area which can accommodate the printed circuit boards affixed to the cover. The top edge of the backplate is preferably bent at an angle of 7° more than a right angle relative to the bottom of the back plate and the bottom edge of the backplate has two small holes 128 extending through the surface of the edge. The top edge of the backplate is also preferably provided with a foam pad 127.

To install a button interface, the backplate is first installed into an electrical box using the L-shaped legs 126. The cover, with the attached printed circuit boards, is then placed onto the backplate by first aligning the top edge of the cover with the top edge of the backplate. The cover is next hinged closed until the embosses 122 on the cover snap into place in the holes 128 in the backplate.

The angled edges of the cover and the backplate are bent sufficiently to hold the cover in place and prevent the cover from moving away from the wall. The foam pad 127 allows a spring fit between the cover and the backplate and compensates for any deviations produced during the formation of the cover or the backplate. The embosses 122 on the cover and the holes 128 in the backplate provide a mechanism to snap the cover into the backplate. Because the cover is firmly mated with the backplate, the slot 124 in the backplate is provided for removal of the cover. To remove the cover, a user simply has to insert a tool in the slot 124 and pry the cover off by removing the embosses 122 from the holes 128.

The backplate and cover provide an interface that can be easily snapped on or off and thus enables easy service and installation of the interface. Also, the interface is securely attached to the wall with the cover securely affixed to the backplate. The interface is a simple and economical assembly that is attached to a standard single or double gang electrical box.

The foregoing description of the preferred embodiments of the invention has been presented for purposes of illustration and description. It is not intended to be exhaustive or to limit the invention to the precise forms disclosed. Many modifications and variations are possible in light of the above teaching. The embodiments were chosen and described in order to best explain the principles of the invention and its practical application to thereby enable others skilled in the art to best utilize the invention and various embodiments and with various modifications as are suited to the particular use contemplated. It is intended that the scope of the invention only be limited by the claims appended hereto.

We claim:

1. An automation system having a home security sub-system, a lighting sub-system, and an environmental control sub-system, comprising:

a controller for providing centralized control of a plurality of sub-systems in said home automation system;

a host interface for interfacing said central controller to a network;

a plurality of nodes connected to said network and located in said sub-systems; and a watch dog timer circuit;

wherein said controller periodically supplies a signal to said watch dog timer circuit, said watch dog timer circuit including timer means which initiates a phone call to an off-site location when said operation signal is not received in a predetermined time interval thereby indicating to said off-site location that said processor is not operational.

2. A home automation system comprising:

a controller for providing centralized control of a plurality of sub-systems in said home automation system;

a host interface for interfacing said central controller to a network;

a plurality of nodes connected to said network in a free form topology, said nodes being located in said sub-systems and being in asynchronous communication with said central controller;

wherein said central controller transmits at periodic intervals a diagnostic message to each node on the network and each of said nodes replies to said message by transmitting an acknowledgement message;

wherein said central controller is connected to a directory of all nodes that should be on said network and said central controller determines whether a node has been disconnected from said network based upon a comparison of all acknowledgement messages received from said nodes with said directory; and wherein said controller periodically supplies a signal to a watch dog timer circuit, said watch dog timer circuit including timer means which initiates a phone call to an off-site location when said operation signal is not received in a predetermined time interval thereby indicating to said off-site location that said processor is not operational.

3. The home automation system as set forth in claim 2, wherein said network comprises a link power network having said diagnostic message and the acknowledgement messages modulated on a DC voltage.

4. The home automation system as set forth in claim 2, wherein said environmental control sub-system is controlled by one of said plurality of nodes, said one of said nodes providing first signals to operate a temperature sensor circuit in a mode wherein said temperature sensor circuit provides a signal indicating an ambient temperature of an environment in which the sensor is located.

5. A home automation system having a security sub-system, a lighting sub-system, and an environmental control sub-system, comprising:

a controller for providing centralized control of a plurality of sub-systems in said home automation system;

a host interface for interfacing said central controller to a network;

a plurality of nodes connected to said network in a free form topology, said nodes being located in said sub-systems;

wherein said controller and said nodes communicate with each other by transmitting messages, each message comprising a destination address designating a node to receive the message and wherein only said node having said destination address intercepts said transmitted message off of said network;

wherein said controller periodically supplies a signal to a watch dog timer circuit, said watch dog timer circuit including timer means which initiates a phone call to an off-site location when said operation signal is not received in a predetermined time interval thereby indicating to said off-site location that said processor is not operational.

6. The home automation system as set forth in claim 5, wherein said message further comprises a source address indicating a source of the message, a message type segment indicating the type of the message, a data length segment indicating the length of the message, and data.

7. The home automation system as set forth in claim 5, wherein said destination address comprises a domain segment, a node ID segment, a type segment, a subtype segment, a board segment, and a connection segment.

8. The home automation system as set forth in claim 5, wherein each hardware device on said network has a mirror image software object residing in said controller.

9. The home automation system as set forth in claim 8, wherein when said controller need to obtain information from a hardware device, said controller transmits a message to its mirror image software object which then transmits said message to its associated hardware device.

10. The home automation system as set forth in claim 8, wherein data has been requested from a hardware device from another node, said hardware device transmits said data to its mirror image software object which then transmits said data to said another node.

11. The home automation system as set forth in claim 8, wherein said destination address comprises a domain segment for distinguishing each hardware device from its mirror image software object.

12. The home automation system as set forth in claim 5, wherein said destination address comprises a domain segment, a type segment, and a node ID segment that uniquely identify each node.

13. The home automation system as set forth in claim 5, wherein said destination address comprises a type segment that distinguishes one type of node from other types of nodes.

14. The home automation system as set forth in claim 5, wherein said destination address comprises a subtype segment that identifies the type of each hardware device connected to said plurality of nodes.

15. The home automation system as set forth in claim 5, wherein said controller broadcasts a single message to every hardware device sharing the same subtype segment.

16. The home automation system as set forth in claim 5, wherein said destination address comprises a board segment that identifies the location of each hardware device connected to said plurality of nodes.

17. The home automation system as set forth in claim 5, wherein said destination address comprises a connection segment that identifies every connection on a hardware device, said hardware device being connected to one of said plurality of nodes.

18. The home automation system as set forth in claim 5, wherein said controller transmits a plurality of diagnostic messages and each node on the network transmits an acknowledgement message back to the controller; and wherein said controller determines whether a node has been disconnected from the network based upon a comparison of the acknowledgement messages received from the nodes to a directory containing a configuration of said network.

19. The home automation system as set forth in claim 5, wherein said environmental control sub-system is controlled by one of said plurality of nodes, said one of said nodes providing first signals to operate a temperature sensor circuit in a mode wherein said temperature sensor circuit provides a signal indicating an ambient temperature of an environment in which the sensor is located.

20. A home automation system having a plurality of sub-systems, such as a security sub-system, a lighting sub-system, and an environmental control sub-system, comprising:

a controller for providing centralized control of said plurality of sub-systems in said home automation system, said plurality of sub-systems being similarly coupled in a network along a common signal path;

a watch dog timer circuit, said controller periodically supplying a signal to said watch dog timer circuit which initiates a phone call to an off-site location when said operational signal is not received in a predetermined interval thereby indicating to said off-site location that said controller is not operational;

a host interface for interfacing said central controller to said network;

a first user interface connected to said network for enabling a user to interface with a first sub-system in said home automation system to control a first hardware device in a first and second manner respectively in response to a first user input and a second user input; and a second user interface connected to said network for enabling said user to interface with a second sub-system in said home automation system to control a second hardware device in said first and second manner respectively in response to said first user input and said second user input;

wherein said first input from said user is used at said first user interface and said second user interface to respectively control both said first hardware device and said second hardware device in said first manner, and said second input from said user is used at said first user interface and said second user interface to respectively control said first hardware device and said second hardware device in said second manner;

whereby said user similarly controls said first hardware device and said second hardware device in a consistent manner when interfacing with either of said first sub-system or said second sub-system.

21. The home automation system as set forth in claim 20, wherein said first user interface comprises:

first means for detecting input signals from said user at said first user interface;

first means for toggling activation of said first hardware device associated with said first sub-system with detection, by said first detecting means, of said first input from said user;

first means for increasing a value of a parameter associated with said first hardware device with detection, by said first detecting means, of said second input from said user; and first means for decreasing a value of said parameter with detection, by said first detecting means, of a third input from said user; and wherein said second user interface comprises:

second means for detecting input signals from said user at said second user interface;

second means for toggling activation of said second hardware device associated with said second sub-system with detection, by said second detecting means, of said first input from said user;

second means for increasing a value of a parameter associated with said second hardware device with detection, by said second detecting means, of said second input from said user; and second means for decreasing a value of said parameter with detection, by said second detecting means, of said third input from said user;

whereby said first hardware device and its associated parameter and said second hardware device and its associated parameter are similarly controlled by said first input, said second input, and said third input.

22. The home automation system as set forth in claim 21, wherein said first input from said user comprises a toggle of a button, said second input from said user comprises a holding down of said button past a time out period, and said third input from said user comprises the holding down of said button past a time out period followed by a release of said button and then a second holding down of said button.

23. The home automation system as set forth in claim 20, wherein said first sub-system comprises said lighting control sub-system, said first hardware device comprises a light, said parameter associated with said first hardware device comprises an intensity of said light; and said second sub-system comprises said environmental control sub-system, said second hardware device comprises a heating unit, and said parameter associated with said second hardware device comprises a heat set point.

24. A home automation system having a home security sub-system, a lighting sub-system, and an environmental control sub-system, comprising:

a controller for providing centralized control of said plurality of sub-systems in said home automation system;

a watch dog timer circuit, said controller periodically supplying a signal to said watch dog timer circuit which initiates a phone call to an off-site location when said operational signal is not received in a predetermined interval thereby indicating to said off-site location that said controller is not operational;

a host interface for interfacing said central controller to a network; and a plurality of nodes connected to said network in a free form topology, said nodes being located in said sub-systems;

wherein said environmental control sub-system includes a heating, ventilation and air-conditioning (HVAC) controller which controls operation of a HVAC unit according to a comparison of a first signal corresponding to a desired temperature and a second signal corresponding to an actual temperature value, said actual temperature value being obtained from a temperature sensor circuit.

25. The home automation system as set forth in claim 24, wherein said temperature sensor circuit comprises a fixed current source in parallel with a temperature-dependent variable circuit, said temperature sensor circuit outputting a temperature dependent current to converter means for obtaining said second signal from said temperature dependent current.

26. The home automation system according to claim 35 wherein said temperature-dependent variable circuit comprises:

a temperature dependent sensor, said temperature dependent sensor outputting a voltage which varies linearly with changes in ambient temperature; and means for converting said voltage to a current.

27. The home automation system according to claim 26, wherein said means for converting said voltage to a current includes an operational amplifier having an output coupled to a base terminal of a transistor, said transistor having an emitter terminal coupled to a resistive element and an input to said operational amplifier.

28. The home automation system according to claim 27, wherein said fixed current source includes a voltage sensor which supplies a fixed voltage to a first input of a second operational amplifier, said second operational amplifier having an output coupled to a base terminal of a second transistor, said second transistor having an emitter terminal coupled to a second resistive element and an input to a second input of said second operational amplifier.

29. A home automation system having a plurality of sub-systems, such as a security sub-system, a lighting sub-system, and an environmental control sub-system, comprising:

a controller for providing centralized control of said plurality of sub-systems in said home automation system;

a watch dog circuit, said controller periodically supplying a signal to said watch dog timer circuit which initiates a phone call to an off-site location when said operational signal is not received in a predetermined interval thereby indicating to said off-site location that said controller is not operational;

a first status indicating means connected to a first sub-system in said home automation system and connected to said network for enabling a user to ascertain the status of a first set of objects in said first sub-system; and a second status indicating means connected to a second sub-system in said home automation system and connected to said network for enabling said user to ascertain the status of a second set of objects in said second sub-system;

wherein said first status indicating means and said second status indicating means represent similar states of said first set of objects and said second set of objects with the same set of indicating signals;

whereby said user ascertains the status of said first set of objects and of said second set of objects in a common, consistent manner with respect to both said first sub-system and said second sub-system.

30. The home automation system as set forth in claim 29, wherein said first status indicating means and said second status indicating means comprise an LED associated with each object in said automation system.

31. The home automation system as set forth in claim 30, wherein an indicating signal in said set of indicating signals comprises a solid on or solid off LED for respectively indicating that its associated object is turned on or off.

32. The home automation system as set forth in claim 29, wherein an indicating signal in said set of indicating signals comprises an LED flashing in a pattern for indicating that its associated object is a slave object being assigned to a master object.

33. The home automation system as set forth in claim 29, wherein an indicating signal in said set of indicating signals comprises an LED flashing in a pattern for indicating that its associated object is a master object being tuned to accept slave objects.

34. The home automation system as set forth in claim 29, wherein an indicating signal in said set of indicating signals comprises an LED flashing in a pattern for indicating that a diagnostic program has found a problem with its associated object.

35. The home automation system as set forth in claim 29, wherein an indicating signal in said set of indicating signals comprises an LED flashing in a pattern for indicating that its associated object will be turned off after a time out period.

36. The home automation system as set forth in claim 29, wherein an indicating signal in said set of indicating signals comprises an LED flashing in a pattern for indicating that its associated object will be turned on after a time out period.

37. The home automation system as set forth in claim 29, wherein an indicating signal in said set of indicating signals comprises an LED pulsing in a sequence for indicating a value of a parameter associated with its associated object.

38. The home automation system as set forth in claim 29, wherein a single LED in each keypad will be dimly lit in order to reveal the location of said keypad.

39. The home automation system as set forth in claim 29, wherein said first set of objects and said second set of objects comprise devices, scenes, scene sets, and security modes.

40. The home automation system as set forth in claim 39, wherein:

said first and second status indicating means respectively comprise first and second button keypads with each keypad having a plurality of buttons; and a device, scene, scene set, or security mode is labelled on each button with devices being labelled in a first manner, scenes in a second manner, scene sets in a third manner, and security modes in a fourth manner;

whereby a user can ascertain whether a particular button is assigned to a device, a scene, a scene set, or a security mode by the labelling of said particular button.

41. A residential automation system utilizing a consistent interface comprising:

a plurality of sub-systems including a home security sub-system, a lighting sub-system, and an environmental control sub-system, each being similarly coupled in a network along a common signal path;

a plurality of logical objects automatically controlled with said system, each object being associated with one or more of said plurality of sub-systems;

a controller for providing centralized control of said plurality of sub-systems in said home automation system;

a watch dog circuit, said controller periodically supplying a signal to said watch dog timer circuit which initiates a phone call to an off-site location when said operational signal is not received in a predetermined interval thereby indicating to said off-site location that said controller is not operational;

a host interface for interfacing said central controller to said network;

a plurality of nodes connected to said network in a free form topology, said nodes being located in said sub-systems;

interface means for controlling operation of each said logical object in a common, consistent manner, said interface means including a plurality of keypads each comprising a plurality of manually operable inputs for generating requests to control one of said plurality of logical objects.

42. The residential automation system according to claim 41, wherein each said manually operable input includes a button provided with indicia which uniquely identifies a type of logical object controlled thereby.

43. The residential automation system according to claim 42, wherein said requests are generated by a toggling one of said buttons, by a holding down of one of said buttons past a time out period, or by a first holding down of one of said buttons down past a time out period followed by a release of said button and then a second holding down of said button.

44. The residential automation system according to claim 41, wherein said logical objects include hardware devices, scenes, scene sets and security modes.

45. The residential automation system according to claim 41, further comprising status indicating means connected to each sub-system in said plurality of sub-systems for enabling a user to ascertain the status of one or more of said logical objects in each sub-system.

46. The residential automation system according to claim 45, wherein said indicating means comprises a plurality of LEDs each of which is associated with one of said logical objects, said LEDs providing indicating signals indicative of a characteristic said status of a corresponding one of said logical objects.

47. The residential automation system according to claim 46, wherein said indicating signals include a solid on or solid off LED for respectively indicating that its associated object is turned on or off.

48. The residential automation system according to claim 46, wherein said indicating signals include an LED flashing in a pattern for indicating that its associated object is a slave object being assigned to a master object.

49. The residential automation system according to claim 46, wherein said indicating signals include an LED flashing in a pattern for indicating that its associated object is a master object being tuned to accept slave objects.

50. The residential automation system according to claim 46, wherein said indicating signals include an LED flashing in a pattern for indicating that a diagnostic program has found a problem with its associated object.

51. The residential automation system according to claim 46, wherein said indicating signals include an LED flashing in a pattern for indicating that its associated object will be turned off after a time out period.

52. The residential automation system according to claim 46, wherein said indicating signals include an LED flashing in a pattern for indicating that its associated object will be turned on after a time out period.

53. The residential automation system according to claim 46, wherein said indicating signals include an LED pulsing in a sequence for indicating a value of a parameter associated with its associated object.

54. The residential automation system according to claim 46, wherein a single LED in each keypad will be dimly lit in order to reveal the location of said keypad.

* * * * *